(12) United States Patent
Zhang

(10) Patent No.: US 10,721,056 B2
(45) Date of Patent: Jul. 21, 2020

(54) KEY PROCESSING METHOD AND DEVICE

(71) Applicant: Alibaba Group Holding Limited, Georgetown, Grand Cayman (KY)

(72) Inventor: Xiaoyu Zhang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 197 days.

(21) Appl. No.: 15/847,689

(22) Filed: Dec. 19, 2017

(65) Prior Publication Data

US 2018/0183569 A1 Jun. 28, 2018

(30) Foreign Application Priority Data

Dec. 26, 2016 (CN) .......................... 2016 1 1223887

(51) Int. Cl.
*H04L 9/00* (2006.01)
*H04L 9/30* (2006.01)
*G09C 1/00* (2006.01)
*G06F 7/72* (2006.01)

(52) U.S. Cl.
CPC ................ *H04L 9/003* (2013.01); *G09C 1/00* (2013.01); *H04L 9/302* (2013.01); *G06F 7/728* (2013.01); *H04L 2209/08* (2013.01); *H04L 2209/12* (2013.01)

(58) Field of Classification Search
CPC .......... G06F 7/723; G06F 17/10; G06F 7/727; G06F 7/728; G06F 21/602; G06F 21/55; G06F 21/577; G06F 2207/7233; G06F 2207/7242; G06F 2207/729
See application file for complete search history.

(56) References Cited

U.S. PATENT DOCUMENTS

| | | |
|---|---|---|
| 6,259,789 B1 | 7/2001 | Paone |
| 2002/0152252 A1 | 10/2002 | Kaminaga et al. |
| 2002/0166057 A1 | 11/2002 | Kaminaga et al. |
| 2003/0044004 A1 | 3/2003 | Blakley et al. |
| 2003/0072442 A1* | 4/2003 | Blakley .................. G06F 7/723 380/28 |
| 2004/0167952 A1 | 8/2004 | Gueron et al. |
| 2004/0236813 A1 | 11/2004 | Grinchuk |
| 2006/0048233 A1 | 3/2006 | Buttross et al. |
| 2007/0064931 A1 | 3/2007 | Zhu et al. |
| 2007/0192547 A1* | 8/2007 | Feghali ................. G06F 9/3001 711/154 |
| 2007/0206784 A1 | 9/2007 | Blakley et al. |

(Continued)

FOREIGN PATENT DOCUMENTS

WO WO02280009 4/2002

OTHER PUBLICATIONS

Homma et al., "Collision-Based Power Analysis of Modular Exponentiation Using Chosen-Message Pairs", (Online) International Workshop on Cryptographic Hardware and Embedded Systems, Springer, Berlin, Germany.

(Continued)

*Primary Examiner* — Tae K Kim

(57) ABSTRACT

An attack on an RSA encryption algorithm based on simple power analysis (SPA) is thwarted by scrambling the sliding window sequence that results from performing sliding window processing on a power exponent. The sliding window sequence is scrambled with a random code that is utilized to determine an adjustment tendency and an adjustment length.

20 Claims, 17 Drawing Sheets

(56) References Cited

U.S. PATENT DOCUMENTS

| | | |
|---|---|---|
| 2008/0005209 A1 | 1/2008 | Kounavis et al. |
| 2008/0019512 A1 | 1/2008 | Gueron et al. |
| 2008/0049931 A1 | 2/2008 | Vasyltsov |
| 2008/0130877 A1 | 6/2008 | Joye |
| 2009/0003606 A1* | 1/2009 | Aciicmez ............ G06F 7/723 380/277 |
| 2009/0003607 A1* | 1/2009 | Aciicmez ............ G06F 7/723 380/277 |
| 2009/0006511 A1 | 1/2009 | Ozturk et al. |
| 2009/0006512 A1 | 1/2009 | Ozturk et al. |
| 2009/0028323 A1 | 1/2009 | Achcmez et al. |
| 2009/0245507 A1* | 10/2009 | Vuillaume ............ G06F 7/72 380/28 |
| 2010/0177886 A1* | 7/2010 | Futa ............ G06F 7/723 380/28 |
| 2012/0246485 A1 | 9/2012 | Norimoto et al. |
| 2013/0297919 A1* | 11/2013 | Kang ............ G06F 9/30 712/241 |
| 2014/0129604 A1 | 5/2014 | Clavier et al. |
| 2014/0281573 A1* | 9/2014 | Jaffe ............ G06F 21/72 713/189 |
| 2015/0052358 A1 | 2/2015 | Udupi et al. |
| 2015/0339102 A1* | 11/2015 | Feix ............ G06F 7/725 380/30 |
| 2016/0261403 A1 | 9/2016 | Benoit et al. |
| 2016/0359621 A1 | 12/2016 | Lin et al. |
| 2017/0118017 A1 | 4/2017 | Sotoodeh |
| 2017/0142121 A1 | 5/2017 | Lee et al. |
| 2017/0164200 A1 | 6/2017 | Naslund et al. |
| 2017/0180349 A1 | 6/2017 | Park |
| 2017/0264600 A1 | 9/2017 | Froelicher et al. |

OTHER PUBLICATIONS

Aciicmez et al., "Predicting Secret Keys Via Branch Prediction", (Online) Cryptographers Track at the RSA Conference, Springer, Berlin, Germany.

Schindler et al.,"More Detail for a Combined Timing and Power Attack Against Implementations of RSA", ima International Conference on Cryptography and Coding, Springer, Berlin, Germany.

* cited by examiner

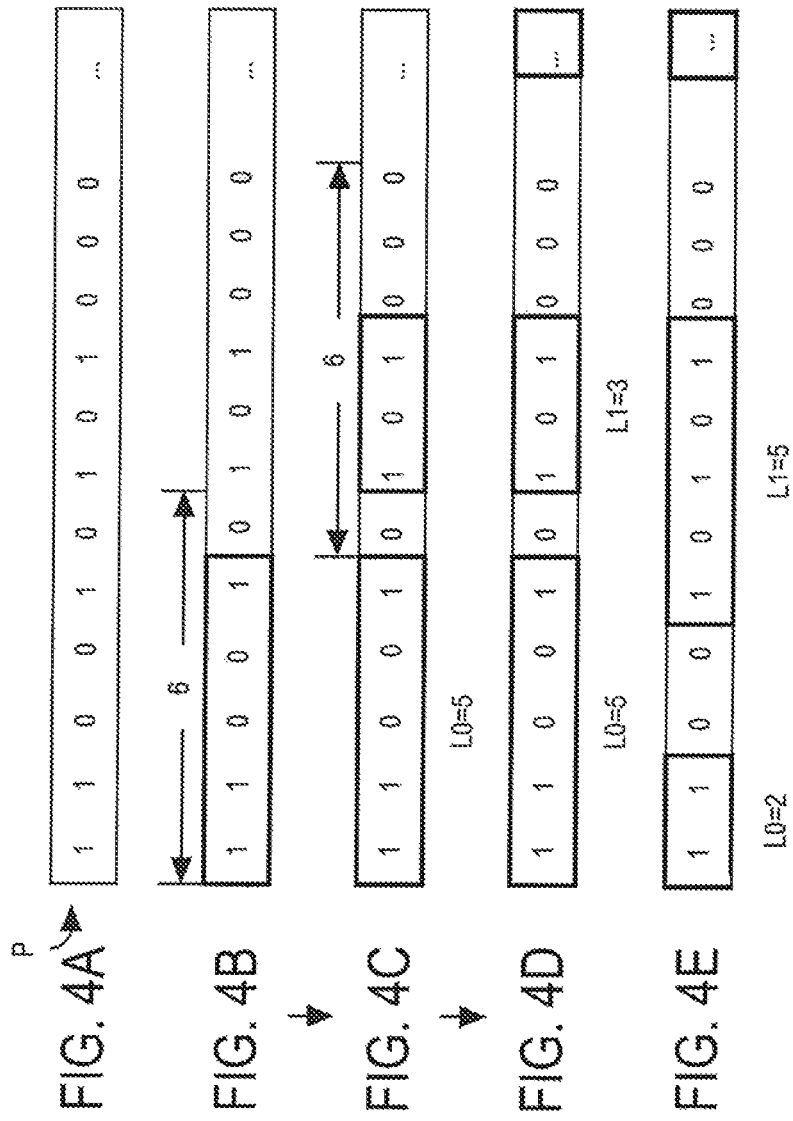

KEY PROCESSING METHOD AND DEVICE

CROSS-REFERENCE TO RELATED APPLICATIONS

This application claims priority to Chinese Patent Application No. 201611223887.6, filed on Dec. 26, 2016, which is incorporated herein by reference in its entirety.

BACKGROUND OF THE INVENTION

1. Field of the Invention

The present invention relates to the field of information security and, in particular, to a key processing method and device.

2. Description of the Related Art

As an important asymmetric signature/encryption algorithm, a Rivest-Shamir-Adleman (RSA) public key encryption algorithm has been widely applied in existing network communications (for example, HTTPS). The principle of the RSA algorithm is to first generate a pair of RSA keys, in which one is a secret key saved by a user, and the other is a public key that may be made public and even registered in a network server. People encrypt a file with a public key and send the file to a person, and then the person can decrypt the file with a private key and receive the file.

An RSA algorithm involves a large amount of computation, and computation of the RSA algorithm is generally implemented on a server side. If RSA encryption/decryption is implemented using software, a lot of CPU resources are consumed, severely affecting performance. If a hardware acceleration unit is used so that the computation-intensive RSA operation is performed independently from a CPU, the CPU can process more requests on the level of a protocol stack and an operating system.

An RSA encryption/decryption algorithm mainly involves two operations: modular squaring (squaring and modulo) and modular multiplication (multiplication and modulo), and these two algorithms are respectively implemented using special arithmetic units. The main algorithmic process of RSA is performing iterative computation using these two arithmetic units, and a processing sequence is obtained by transforming an input exponent.

In an RSA public key encryption algorithm, for a "0-bit" of a power exponent (which is generally a public key, a private key, or a relevant calculated value), only modular squaring needs to be performed in the RSA algorithm, while for a "1-bit", modular squaring and modular multiplication need to be performed in turn in the RSA algorithm.

Due to the difference between the two algorithms "modular squaring" and "modular multiplication" in both power consumption and time consumption, a password can be cracked by precise measurement and inversion. For example, simple power analysis (SPA), as an attack method based on power consumption measurement, can easily attack the RSA encryption algorithm by analyzing obvious changes in energy consumption of different parts of the encryption algorithm when performing the operation.

In order to enhance the security of a key, "sliding window processing" is performed on the key to resist the SPA attacks in the prior art. "Sliding window processing" is performing sliding window processing on a power exponent from a most significant bit (MSB) to a least significant bit (LSB) and calculating an "effective" window length in each sliding window, and performing one modular multiplication operation only when the effective window ends.

Since in an existing classical RSA computation method based on "sliding window processing," for a power exponent and a sliding window length upper limit value that are given, an effective sliding window length sequence thereof is also uniquely determined. As a result, such method can still easily obtain the length of each effective window by SPA, and then derive reversely the distribution characteristics of the effective windows, so as to further attack and crack a key.

With the wider and wider application of smart cards, IC cards, electronic keys (USB keys), and so on in many fields such as e-commerce and identity authentication, the smart cards, IC cards, electronic keys (USB keys), and so on incorporate two functions of data encryption and data storage, have characteristics of small sizes, convenient use, powerful functions, high security, and low prices, become one of the strong driving forces for development of e-commerce, and are further widely applied in other fields such as transportation, medical treatment, and identity authentication, thereby greatly improving modernization of life and work of people.

Small hardware devices such as smart cards, IC cards, and electronic keys (USB keys) are not only used for implementing encrypted data transmission, but also used for implementing functions such as digital signature and key exchange. An RSA encryption algorithm is the first algorithm that can be used for both data encryption and digital signature, and therefore provides a basic method for encryption and discrimination of information on a public network and is widely applied to smart IC cards and network security products.

As noted above, RSA is an important asymmetric signature/encryption algorithm involving a large amount of computation, which, if implemented using software, requires consumption of a lot of CPU resources, severely affecting the encryption/decryption speed. However, if a hardware acceleration unit is used, the computation-intensive RSA operation can be performed independently from a CPU, and thus the CPU can process more requests on the level of a protocol stack and an operating system.

The hardware acceleration unit usually adopts a multi-computing core (engine) solution for processing. Each computing engine needs to apply to the CPU for a different arithmetic logic unit (ALU) for invocation at a different computing stage. An ALU is an execution unit of the central processing unit (CPU), is the core part of all central processing units, and mainly functions to perform a binary arithmetic operations (for example, operations such as addition, subtraction and multiplication). An RSA algorithm mainly involves two arithmetic operations "modular squaring" and "modular multiplication," which are respectively implemented using special arithmetic logic units (ALUs).

Due to the difference between the two arithmetic operations "modular squaring" and "modular multiplication" in both power consumption and time consumption, they are vulnerable to simple power analysis (SPA) attacks. SPA is an attack method based on power consumption measurement. An attacker directly observes power consumption of a system in an SPA attack. Due to obvious changes of an RSA algorithm when different parts perform the two arithmetic operations "modular squaring" and "modular multiplication," the RSA can be recognized by the SPA.

In order to prevent an RSA encryption algorithm from SPA attacks, the following several methods are generally adopted in the prior art to resist SPA attacks. A first solution is to implement both "modular squaring" and "modular multiplication" algorithms involved in an RSA algorithm by a modular multiplier. Since a modular squarer has higher speed and smaller area than a modular multiplier, the use of a modular multiplier in place of a modular squarer in the first solution sacrifices performance and costs and has great influence on speed in spite of the effect in resisting SPA attacks.

A second solution is to design a modular multiplier and a modular squarer that have the same power consumption. The solution requires more complex designs for the modular multiplier and the modular squarer that keep the same power consumption for a large number of input data combinations, which increases design complexity and verification complexity and reduces reliability to a large extent. It should be noted that it is still likely to deduce whether the current operation is modular squaring or modular multiplication from side-channel information such as power consumption in the first solution and the second solution while specific types of input sequences are included.

A third solution is to add a redundant module for power disturbance. The redundant module may disturb power consumption measurement by means of (quasi) random noise, but also introduces higher power consumption and brings about more spurious noise, affecting signal integrity.

A fourth solution is to perform "sliding window processing" on a specific step of an RSA algorithm. "Sliding window processing" is performing sliding window processing on a power exponent from a most significant bit (MSB) to a least significant bit (LSB), calculating an "effective" window length in each sliding window, and performing a modular multiplication operation only when the effective window ends.

The sliding window processing is an optimized algorithm for rapidly calculating a modular exponentiation, where the modular exponentiation may be decomposed into a series of multiplication operations and squaring operations. A window of a certain size is used to slide on a binary power exponent, and an element in a pre-calculation table is used directly as a multiplier. As a result, the steps of repeated calculation of the multiplier are reduced, computation efficiency is improved, and the sliding window processing can be used in an RSA encryption algorithm.

However, in the fourth solution, for a power exponent and a sliding window length upper limit value that are given, an effective sliding window length sequence thereof is also uniquely determined. Therefore, such method can still easily obtain the length of each effective window by SPA, and then derive reversely the distribution characteristics of the effective windows, so as to further attack and crack a key.

Specifically, the present application first analyzes an existing classical RSA computation method based on "sliding window processing" before describing further details of the embodiment of the key processing method provided in the present application. FIG. 1 shows a block diagram that illustrates an example of a classical RSA hardware structure based on "sliding window processing" according to the prior art. FIG. 2 shows a flow diagram that illustrates an example of a classical RSA computation method based on "sliding window processing" according to the prior art.

As shown in FIG. 2, an RSA algorithm based on "sliding window processing" includes defining an arithmetic device $MMM(a, b) = a*b*R^{-1} \mod M$, namely, a Montgomery modular multiplier. R is a binary power of a, b, and M and satisfies $R*R^{-1} = 1 \pmod{M}$, for example, when an encryption length of RSA is 2048 bits, $R = 2^{2048}$.

Input: Ain, P, M;

output: Result=Ain ^ P mod M.

The first step: pre-calculation: calculate $R^2$ and A.
$R^2 = MMM(R*R, R)$;
$A = MMM(Ain, R^2)$.

The second step: exponentiation and modulo calculation: save an intermediate result of each iteration into a base register B.

First, perform sliding window traversal on P in order from the MSB to the LSB, where the total number of effective sliding windows is denoted by n, and calculate a corresponding effective sliding window length sequence $L = \{L0, L1, L2, L3, \ldots, Ln\}$. Second, traverse each effective sliding window Li in turn (i=0, 1, 2 ... n), including each bit in Li corresponds to one operation B=SQR(B), and each Li corresponds to one operation B=MMM(B, A) after Li ends.

The third step: post-processing: calculate a final result.
Result=MMM(B, 1).

It can be seen from the aforementioned steps that the classical RSA computation method based on "sliding window processing" has the disadvantage that, for a power exponent P and a sliding window length upper limit value that are given, an effective sliding window length sequence thereof is also uniquely determined, and therefore, such method can still obtain the length of each effective window by SPA, and then derive reversely the distribution characteristics of the effective windows, so as to further attack and crack a key.

To sum up, existing RSA algorithms resisting SPA attacks have their own deficiencies. No effective solution has been proposed at present with regard to the aforementioned problem that an existing RSA encryption algorithm based on "sliding window processing" is vulnerable to SPA attacks.

SUMMARY OF THE INVENTION

The present invention provides methods, devices, and mediums for thwarting an attack based on simple power analysis (SPA). The present invention provides a method of processing a key. The method acquires a sliding window sequence of the key. The sliding window sequence includes a plurality of sliding windows. The method also scrambles one or more sliding windows in the sliding window sequence to obtain a scrambled sliding window sequence. In addition, the method traverses the scrambled sliding window sequence, and Montgomery modular multiplies the scrambled sliding window sequence.

The present invention also provides a key processing device that includes a memory and a processor that is coupled to the memory. The processor to execute instructions stored in the memory to acquire a sliding window sequence of the key. The sliding window sequence includes multiple sliding windows. The processor to also scramble one or more sliding windows in the sliding window sequence to obtain a scrambled sliding window sequence. The processor to further traverse the scrambled sliding window sequence to perform post-processing on the scrambled sliding window sequence using a Montgomery modular multiplier.

The present invention also provides a non-transitory computer-readable medium having computer executable instructions for performing a method for processing a key. The method includes acquiring a sliding window sequence of the key, the sliding window sequence including a plurality of sliding windows. The method also includes scrambling one or more sliding windows in the sliding window sequence to obtain a scrambled sliding window sequence. The method further includes traversing the scrambled sliding window sequence, and Montgomery modular multiplying the scrambled sliding window sequence.

A better understanding of the features and advantages of the present invention will be obtained by reference to the following detailed description and accompanying drawings which set forth an illustrative embodiment in which the principals of the invention are utilized.

BRIEF DESCRIPTION OF THE DRAWINGS

The accompanying drawings described herein are used for providing further understanding of the present invention and constitute a part of the present application. Exemplary embodiments of the present invention and the description thereof are used for explaining the present invention instead of constituting improper limitation to the present invention.

FIGS. 4A-4E are diagrams illustrating an example of sliding window key processing in accordance with the present invention. FIG. 4A is a diagram illustrating a binary sequence of an exponent P in accordance with the present invention. FIG. 4B is a diagram illustrating an example of a first sliding window processing step in accordance with the present invention. FIG. 4C shows a diagram that illustrates an example of a second sliding window processing step in accordance with the present invention. FIG. 4D shows a diagram that illustrates an example of an nth sliding window processing step in accordance with the present invention. FIG. 4E is a diagram illustrating an example of sliding window key processing with a scrambling operation in accordance with the present invention.

DETAILED DESCRIPTION OF THE INVENTION

Figure 1:
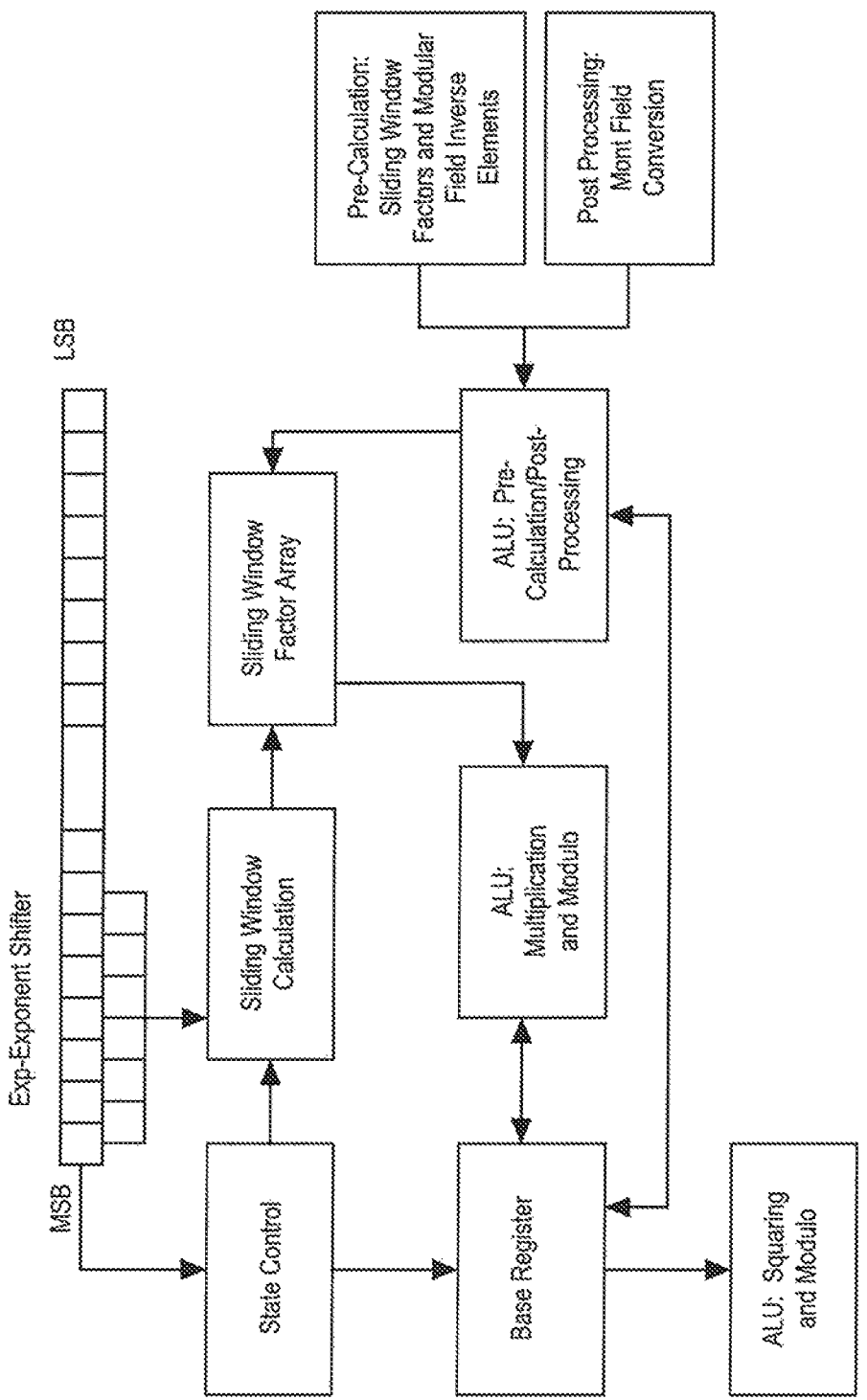
FIG. 1 is a block diagram illustrating an example of a classical RSA hardware structure based on "sliding window processing" according to the prior art.
Figure 2:
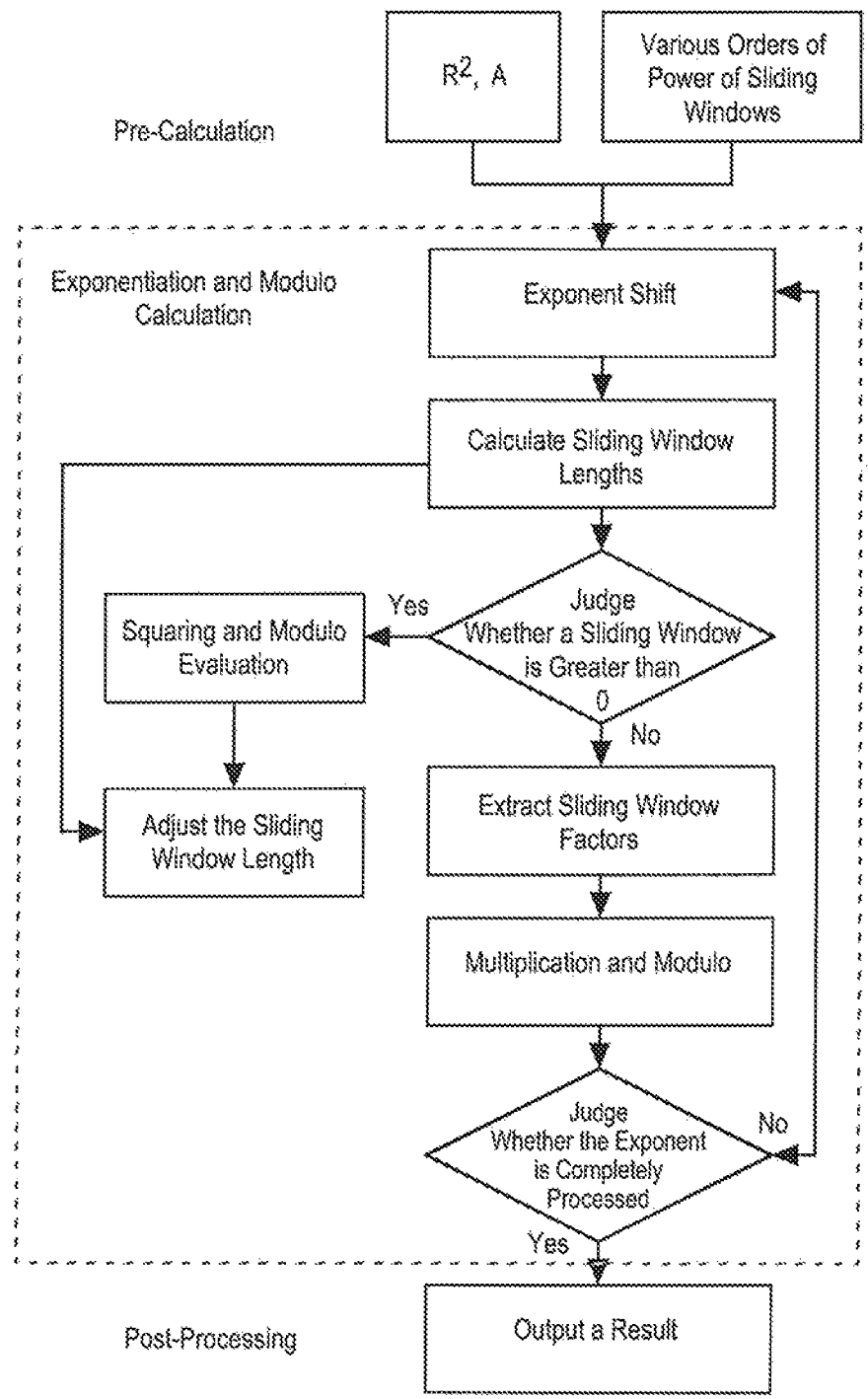
FIG. 2 is a flow diagram illustrating an example of a classical RSA computation method based on "sliding window processing" according to the prior art.

To enable those skilled in the art to better understand the solutions in the present invention, the technical solutions in the embodiments of the present invention will be described clearly and completely below with reference to the accompanying drawings in the embodiments of the present invention. It is apparent that the described embodiments are merely some, rather than all of the embodiments of the present invention. All other embodiments obtained by those of ordinary skill in the art based on the embodiments in the present invention without any creative work shall fall within the protection scope of the present invention.

It should be noted that the terms such as "first" and "second" in the specification, the claims, and the aforementioned accompanying drawings of the present invention are used to distinguish between similar objects, and are not necessarily used to describe a specific sequence or a sequence of priority. It should be understood that numbers used in this way are interchangeable in a suitable situation, so that the embodiments of the present invention described herein can be implemented in a sequence in addition to a sequence shown or described herein. In addition, terms such as "include" and "have" and any variation thereof are intended to cover non-exclusive inclusion, for example, processes, methods, systems, products, or apparatuses including a series of steps or units are not necessarily limited to the steps or units that are clearly listed, and may include other steps or units that are not clearly listed or that are inherent to the processes, methods, products, or apparatuses.

First, the following interpretations apply to some nouns or terms appearing in the process of describing the embodiments of the present application. An RSA algorithm is an asymmetric cryptographic algorithm, where being asymmetric means the algorithm requires a pair of keys in which one is used for encryption, while the other is required for decryption.

An Algorithm Logic Unit (ALU) is a combinatorial logic circuit implementing multiple sets of arithmetic operations and logic operations. A simple power analysis (SPA) is an attack method based on power consumption measurement. MSB is the most significant bit, namely, a bit "1" at the highest position in a binary sequence corresponding to an exponent P. LSB is the least significant bit, namely, a bit "1" at the lowest position in a binary sequence corresponding to an exponent P.

A Montgomery modular multiplier (MMM) is an arithmetic device configured to perform a Montgomery modular multiplication algorithm, which can obtain a result of a modular multiplication operation without using division (by a shift operation). PN sequence is a pseudo noise, a pseudo-random number sequence, a PN sequence code generated by a PN sequence generator.

Sliding window processing is a solution for processing a key using a "sliding window algorithm," where the sliding window algorithm is an optimized algorithm for rapidly calculating a modular exponentiation. The modular exponentiation may be decomposed into a series of multiplication operations and squaring operations. A window of a certain size is used to slide on a binary power exponent, and an element in a pre-calculation table is used directly as a multiplier, so that the steps of repeated calculation of the multiplier are reduced. As a result, computation efficiency is improved, and the sliding window processing can be used in an RSA encryption algorithm.

A sliding window sequence is where multiple effective window length values are statistically obtained after sliding window processing is performed on a binary sequence of a key, and a sequence that includes these effective window lengths is a sliding window sequence.

It should be noted that steps shown in the flow diagrams in the accompanying drawings may be executed in a computer system such as a set of computer executable instructions. Furthermore, although the logic sequence is shown in the flow diagrams, in some cases, the shown or described steps may be executed in a sequence different from the sequence herein.

A method of processing a key is provided according to the present invention. The method of key processing may be applied to all encryption algorithms involving sliding window processing in the field of information security such as, for example, an RSA encryption algorithm based on "sliding window processing."

The most time-consuming algorithm in public key encryption algorithms is usually a modular exponentiation algorithm. The modular exponentiation algorithm calculates $m^e$ mod n while knowing a modulus n, a base m, and an exponent e. A sliding window algorithm can rapidly implement modular exponentiation.

The basic idea thereof is to use a window having a fixed size of k to slide on a binary modular power exponent e from left to right (or from right to left), end the sliding process when the rightmost side of the window first meets "1", and then create a window to slide for another time from the place where the last sliding ends until there is no "1" in the binary expression of the exponent e.

For a binary sequence (namely, the binary sequence of the exponent) and a sliding window size that are given, a sequence of effective sliding window lengths (namely, actual window sizes), obtained after sliding window processing is performed on the binary sequence, can be determined. This, in turn, causes a hidden danger of attacks to an encryption algorithm that has high security requirements. However, the method of key processing provided in the present application performs scrambling processing on an obtained sliding window sequence.

By means of the present invention, a pseudo-random scrambling code is added into an exponent control operation sequence of RSA to randomly change the original effective window length sequence distribution of a power exponent without increasing power consumption and time delay, so that only a blinded measurement result can be obtained by an SPA attack, thereby desirably resisting the SPA attack with a single engine.

Figure 3:
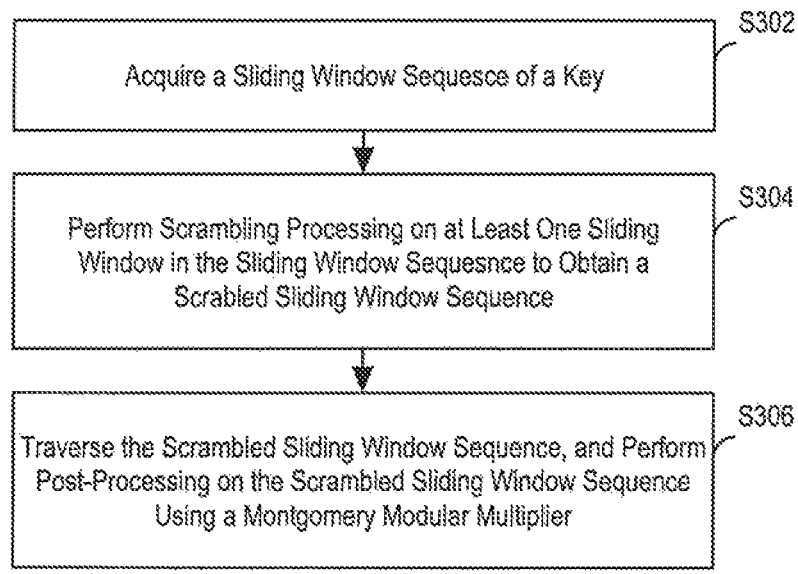
FIG. 3 is a flow chart illustrating an example of a method 300 of processing a key in accordance with the present invention.

FIG. 3 shows a flow chart that illustrates an example of a method 300 of processing a key in accordance with the present invention. As shown in FIG. 3, method 300 begins at step S302 by acquiring a sliding window sequence of a key. Specifically, the key may be a parameter input to an algorithm for converting a plaintext into a ciphertext or converting a ciphertext into a plaintext, and can be categorized into a symmetric key and an asymmetric key. In an alternative embodiment, the key may be an exponent for modular exponentiation of a transmitted signal in an RSA encryption algorithm.

A sliding window sequence corresponding to a binary sequence of the key can be obtained by performing sliding window processing on the binary sequence. The sliding window sequence is a sequence that includes multiple effective window length values obtained after the sliding window processing is performed on the binary sequence.

Specifically, a window having a fixed length/size is used to slide on the binary sequence of the key from left to right (or from right to left). The sliding process ends when the rightmost side of the window first meets "1", and then a window is created to slide for another time from the place where the last sliding ends until there is no "1" in the binary sequence, so as to obtain multiple effective windows, and a sequence that includes binary digits in these effective windows is the sliding window sequence of the key.

It should be noted herein that an RSA algorithm involves two arithmetic operations "modular squaring" and "modular multiplication," and due to the difference between the two arithmetic operations "modular squaring" and "modular multiplication" in both power consumption and time consumption, they are vulnerable to SPA attacks, where SPA is an attack method based on power consumption measurement.

In order to prevent an RSA encryption algorithm from SPA attacks, a "sliding window algorithm" may be used to perform sliding window processing on a key of the RSA algorithm and calculate an effective window length (namely, an actual window length) in each sliding window, and perform one modular multiplication operation only when the effective window ends.

The "sliding window algorithm" is an optimized algorithm for rapidly calculating a modular exponentiation, where the modular exponentiation may be decomposed into a series of multiplication operations and squaring operations. A window of a certain size is used to slide on a binary power exponent, and an element in a pre-calculation table is used directly as a multiplier. As a result, the steps of repeated calculation of the multiplier are reduced, computation efficiency is improved, and the sliding window algorithm can be used in an RSA encryption algorithm.

FIGS. 4A-4E show diagrams that illustrate an example of sliding window key processing in accordance with the present invention. FIG. 4A shows a diagram that illustrates a binary sequence of an exponent P in accordance with the present invention. Using an RSA algorithm as an example, assume the original input of an exponent P (key) is 0xCA8FF . . . , then a corresponding binary sequence thereof is "110010101000 . . . " as shown in FIG. 4A.

FIG. 4B shows a diagram that illustrates an example of a first sliding window processing step in accordance with the present invention. In the case where a sliding window length upper limit is set to 6, after the first sliding window processing step has been performed on the binary sequence of the exponent P using a window having a length of 6, the sliding window ends when meeting "1", and therefore, the obtained first effective window length in the sliding window sequence is L0=5 denoted by a thick line box.

FIG. 4C shows a diagram that illustrates an example of a second sliding window processing step in accordance with the present invention. As shown in FIG. 4C, processing continues at the end position of the binary sequence using a window having a length/size of 6. After the second sliding window processing step has been performed on the binary sequence of the exponent P using a window length of 6, the sliding window ends when meeting "1", and therefore, the obtained second effective window length in the sliding window sequence is L1=3 denoted by a thick line box.

FIG. 4D shows a diagram that illustrates an example of an nth sliding window processing step in accordance with the present invention. As shown in FIG. 4D, the sliding window processing continues until the entire binary sequence is traversed.

It should be noted that in an RSA public key encryption algorithm, for a "0"-bit of a power exponent (which is generally a public key, a private key, or a relevant calculated value), only modular squaring needs to be performed in the RSA algorithm, while for a "1"-bit, modular squaring and modular multiplication need to be performed in turn in the algorithm. Therefore, each sliding window starts from a "1"-bit, and a "0"-bit between sliding windows is only subjected to a modular squaring operation, does not affect the distribution of MMM operations, and is denoted by a thin line box in the figure.

Referring back to FIG. 3, after acquiring the sliding window sequence of the key in step S302, method 300 moves to step S304 to scramble at least one sliding window in the sliding window sequence to obtain a scrambled sliding window sequence. Specifically, the sliding window sequence may be a sequence that includes window length values in multiple effective sliding windows that are statistically obtained after these effective sliding windows are obtained by performing sliding window processing on the binary sequence of the key.

After the sliding window sequence of the key is obtained by performing sliding window processing on the binary sequence of the key, scrambling processing may be performed on one or more effective window length values in the sliding window sequence. In an alternative solution, an effective window length value may be processed using a random number, so as to be obtain a scrambled sliding window sequence.

FIG. 4E shows a diagram that illustrates an example of sliding window key processing with a scrambling operation in accordance with the present invention. As shown in FIG. 4E, when a scrambling code is added, the original sliding window length sequence of L0=5, L1=3, changes to L0=2, L1=5, . . . .

Referring back to FIG. 3, after the scrambling processing has been performed in step S304, method 300 next moves to step S306 to traverse the scrambled sliding window sequence, and Montgomery modular multiply the scrambled sliding window sequence (i.e., perform post-processing on the scrambled sliding window sequence using a Montgomery modular multiplier).

Specifically, the Montgomery modular multiplier may be an arithmetic device configured to perform a Montgomery modular multiplication algorithm, after scrambling processing has been performed on at least one effective window length value in the sliding window sequence to obtain a scrambled sliding window sequence. The scrambled sliding window sequence is traversed, and post-processing is performed on the scrambled sliding window sequence using the Montgomery modular multiplier.

Still using the aforementioned RSA algorithm as an example, it can be seen from FIG. 4D that since the original sliding window length sequence is L0=5, L1=3, . . . , the first two Montgomery modular multiplication (MMM) operations occur at end positions of sliding windows L0 and L1, namely, the $5^{th}$ bit and the $9^{th}$ bit starting from the MSB.

As shown in FIG. 4E, the sliding window length sequence into which the scrambling code is added changed, that is, L0 and L1 are adjusted and corrected to L0=2, L1=5. It can be seen that the first two Montgomery modular multiplication (MMM) operations occur at end positions of sliding windows L0 and L1, namely, the $2^{nd}$ bit and the $9^{th}$ bit starting from the MSB.

In view of the above, scrambling processing is performed on a sliding window sequence to randomly change the original effective window length sequence distribution of the power exponent without increasing power consumption and time delay, so as to desirably resist SPA attacks with a single engine.

It should be noted that since the core algorithm of an RSA public key encryption algorithm is modular exponentiation and the modular exponentiation is equivalent to the cycle of a modular multiplication operation. The primary problem in improving the efficiency of an RSA algorithm is to improve the efficiency of a modular multiplication operation.

The most complex link in the modular multiplication process is a modulo operation, because one division operation actually includes multiple addition, subtraction, and multiplication operations. The efficiency of the algorithm can be greatly improved if division can be reduced or even avoided in the algorithm. Montgomery modular multiplication actually solves such a problem, that is, obtains a result of a modular multiplication operation without using division (by a shift operation).

In view of the above, sliding window processing is performed on a binary sequence of a key, and statistics are collected on an effective sliding window length sequence obtained by performing sliding window processing on the key to obtain a sliding window sequence of the key. Then a scrambling code is added into the obtained sliding window sequence for blinding. In an alternative embodiment, a pseudo-random scrambling code may be added into an exponent control operation sequence (namely, a sliding window sequence) of an RSA encryption algorithm.

Finally, post-processing is performed on the scrambled sliding window sequence using a Montgomery modular multiplier, so that the purpose of changing the effective window length sequence and distribution that are obtained by performing sliding window processing on the key while increasing the original power consumption and time delay is achieved, so as to realize the technical effect of improving the security of the key. Therefore, the present invention solves the technical problem that an existing RSA encryption algorithm based on "sliding window processing" is vulnerable to SPA attacks.

Figure 5A:
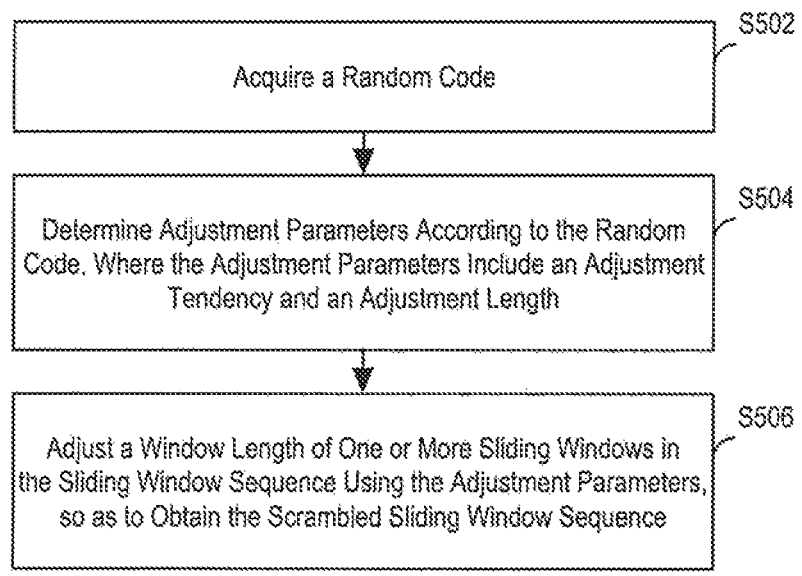
FIGS. 5A-5B are a flow chart illustrating an example of a method 500 of scrambling a sliding window sequence of the key in accordance with the present invention.
Figure 5B:
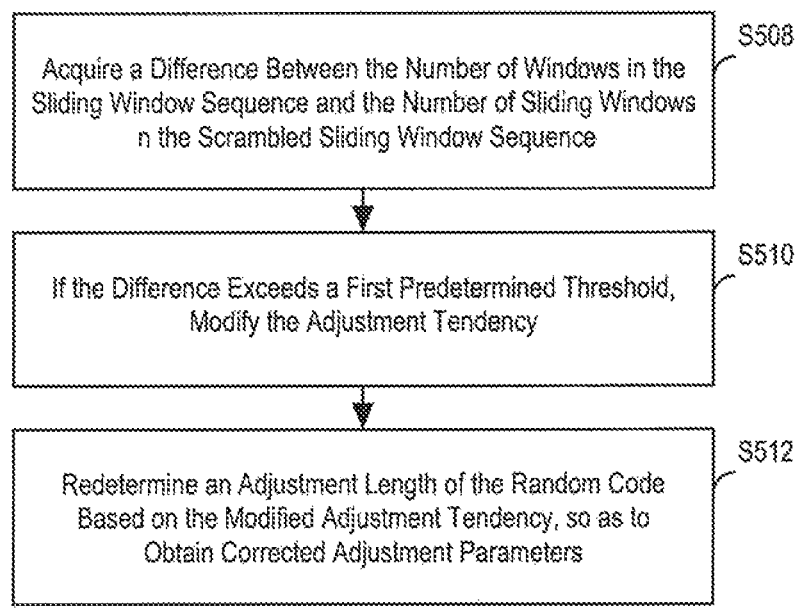

FIGS. 5A-5B show a flow chart that illustrates an example of a method 500 of scrambling a sliding window sequence of the key in accordance with the present invention. As shown in FIG. 5A, method 500 scrambles at least one sliding window in the sliding window sequence to obtain a scrambled sliding window sequence, and begins at step S502 by acquiring a random code Following this, method 500 moves to step S504 to determine adjustment parameters based on the random code, where the adjustment parameters include an adjustment tendency and an adjustment length.

Next, method 500 moves to step S506 to adjust a window length of one or more sliding windows in the sliding window sequence based on the adjustment parameters, so as to obtain the scrambled sliding window sequence. Specifically, the random code may be a sequence that includes numbers and letters randomly generated by a random code generator. The adjustment parameters may be used for adjusting the length of a sliding window, and include an adjustment tendency and an adjustment length.

In an alternative embodiment, using an RSA algorithm as an example, after a sliding window sequence L={L0, L1, L2, L3, . . . , Ln} is obtained by performing sliding window processing on a key of RSA, the magnitude of each sliding window length value Li in the sliding window sequence may be adjusted. First, whether to increase or decrease the magnitude of a sliding window length value Li is determined, and then a length value for adjusting the sliding window length value Li is determined according to the magnitude of the random code sequence value after the tendency for adjusting the sliding window length value Li is determined.

As shown in FIGS. 4B-4D, the magnitude of the sliding window length L0 is 5 and the magnitude of L1 is 3 in the original sliding window sequence L={L0, L1, L2, L3, . . . , Ln}. As shown in FIG. 4E, after the length values of the sliding windows are adjusted using the adjustment parameters determined according to the random code, the magnitude of the sliding window length L0 is 2 and the magnitude of L1 is 5 in the obtained scrambled sliding window sequence.

Based on the solution disclosed in the aforementioned steps S502 to S506, after sliding window processing has been performed on a key to acquire a sliding window sequence of the key, a random code is acquired, and a tendency and a magnitude for adjusting the sliding window sequence are determined according to the random code. After this, a window length of one or more sliding windows in the sliding window sequence is adjusted, so as to obtain a scrambled sliding window sequence.

In an alternative embodiment, the random code may be a pseudo-noise (PN) sequence code generated by a PN sequence generator. By means of the aforementioned embodiment, the purpose of blinding the sliding window sequence obtained by processing the key is achieved, so that the original effective window length sequence and distribution of the power exponent can be hidden.

Figure 6A:
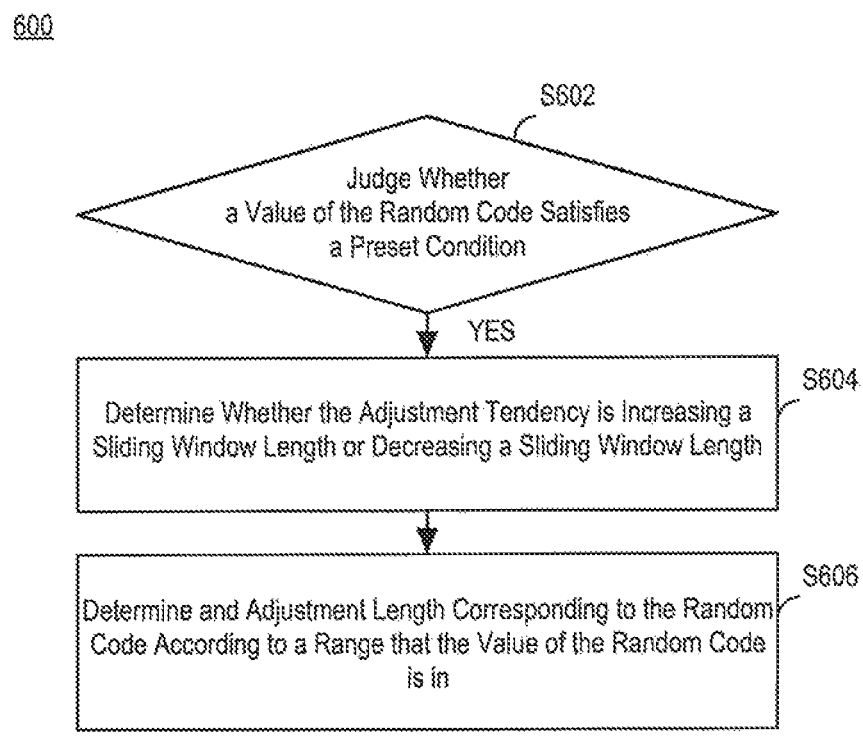
FIGS. 6A-6B are a flow chart illustrating an example of a method 600 of determining adjustment parameters according to the random code in accordance with the present invention.
Figure 6B:
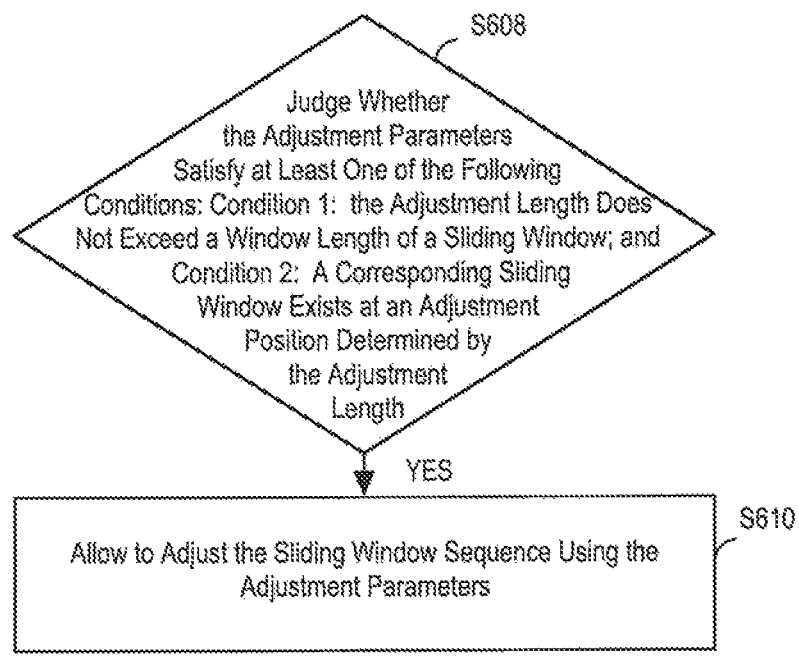

FIGS. 6A-6B show a flow chart that illustrates an example of a method 600 of determining adjustment parameters according to the random code in accordance with the present invention. Method 600 can be utilized to implement step S504. As shown in FIG. 6A, method 600 begins at step S602 by judging whether a value of the random code satisfies a preset condition.

If the value of the random code satisfies the preset condition, method 600 moves to step S604 to determine whether the adjustment tendency is increasing a sliding window length or decreasing a sliding window length. After this, method 600 moves to step S606 to determine an adjustment length based on the random code according to a range that the value of the random code is in.

Specifically, in the aforementioned steps, the random code may be a PN sequence code generated by a PN sequence generator. After the random code has been acquired, it is judged whether a value of the random code satisfies a preset condition. In an alternative embodiment, it may be judged whether the random code is less than an upper limit value of the original sliding window sequence.

If the value of the random code satisfies the preset condition, the random code is compared with a standard value so as to determine a tendency for adjusting the sliding window sequence, including increasing a sliding window length and decreasing a sliding window length. After the tendency for adjusting the sliding window sequence is determined, a length for adjusting the sliding window sequence is further determined according to a range that the value of the random code is in.

The tendency and the magnitude for adjusting the sliding window sequence are determined according to the value of the random code satisfying a preset condition, so that some random codes not satisfying the condition are avoided in adjusting the sliding window sequence, and the probability of errors is reduced.

Following this, as shown in FIG. 6B, method 600 moves to step S608 to judge whether the adjustment parameters (e.g., the adjustment length), satisfy at least one of the following conditions:

condition 1: the adjustment length does not exceed a window length of a sliding window; and condition 2: a corresponding sliding window exists at an adjustment position determined by the adjustment length.

If any one or more of the conditions is satisfied, method 600 moves to step S610 to adjust the sliding window sequence using the adjustment parameters. Specifically, in the aforementioned steps, the adjustment length is a sliding window length for adjusting the original sliding window sequence of the key. After parameters for adjusting the original sliding window sequence of the key are determined according to the random code, it is judged whether a length for adjusting a sliding window in the original sliding window sequence exceeds a window length of the sliding window, or whether a corresponding sliding window exists at a position for adjusting a sliding window in the original sliding window sequence.

The corresponding sliding window in the sliding window sequence is adjusted using the adjustment parameters only when either or both of the conditions are satisfied. By means of the aforementioned embodiment, the adjustment parameters are verified, so as to further increase the probability of successful sliding window adjustment.

Referring next to FIG. 5B, after adjusting a window length of one or more sliding windows in the sliding window sequence using the adjustment parameters in step 506, method 500 moves to step S508 to acquire a difference between the number of windows in the sliding window sequence and the number of sliding windows in the scrambled sliding window sequence.

After this, method 500 moves to step S510. In step S510, if the difference exceeds a first predetermined threshold, method 500 modifies the adjustment tendency. After the adjustment tendency has been modified, method 500 moves to step S512 to redetermine an adjustment length of the random code based on the modified adjustment tendency, so as to obtain corrected adjustment parameters.

Specifically, in the aforementioned steps, after a window length of one or more sliding windows in the sliding window sequence is adjusted using the adjustment parameters, the number of sliding windows in the original sliding window sequence and the number of sliding windows in the new sliding window sequence obtained after scrambling processing is performed on the sliding window sequence are separately acquired.

It is judged whether a difference between them exceeds a first predetermined threshold. If the difference between them exceeds the first predetermined threshold, the adjustment tendency for a sliding window in the original sliding window sequence is modified (that is, if the original adjustment tendency is increasing the length of a sliding window in the original sliding window sequence, the adjustment tendency is modified as decreasing the length of a sliding window in the original sliding window sequence; if the original adjustment tendency is decreasing the length of a sliding window in the original sliding window sequence, the adjustment tendency is modified as increasing the length of a sliding window in the original sliding window sequence). After the adjustment tendency for a sliding window in the original sliding window sequence is determined, an adjustment length of the random code is redetermined to obtain corrected adjustment parameters.

In an alternative embodiment, the number of windows in the sliding window sequence may be the number of non-zero-length effective windows in the sliding window sequence. By means of the aforementioned embodiment, it can be ensured that the number of sliding windows in the scrambled sliding window sequence is equal to the number of windows in the original sliding window sequence, so as to ensure the effect of blinding the sliding window sequence without increasing the original power consumption and time delay.

Figure 7A:
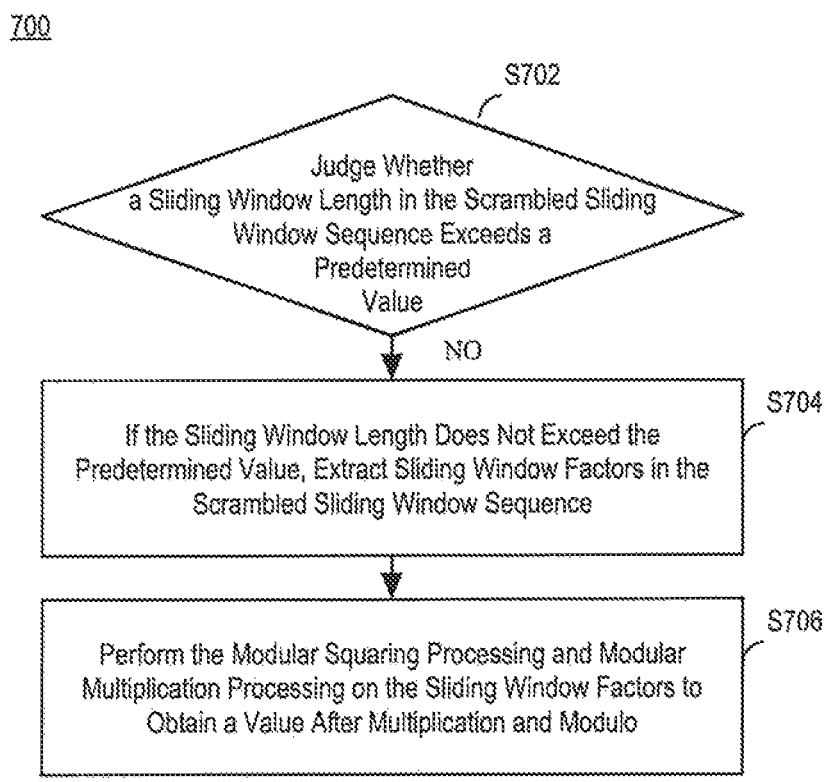
FIGS. 7A-7B are a flow chart illustrating an example of a method 700 of post processing in accordance with the present invention.
Figure 7B:
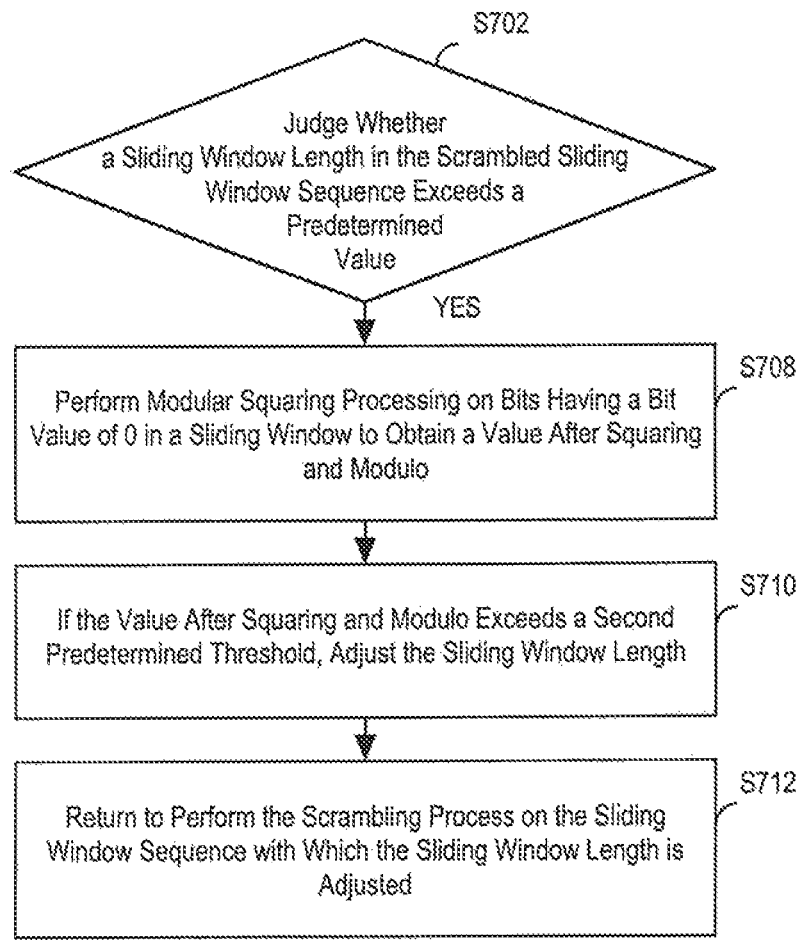

FIGS. 7A-7B show a flow chart that illustrates an example of a method 700 of post processing in accordance with the present invention. Method 700 can be performed before step S306. As shown in FIG. 7A, method 700 begins at step S702 by judging whether a sliding window length in the scrambled sliding window sequence exceeds a predetermined value.

If the sliding window length does not exceed the predetermined value in step S702, method 700 moves to step S704 to extract sliding window factors in the scrambled sliding window sequence. Following this, method 700 moves to step S706 to perform modular squaring processing and modular multiplication processing on the sliding window factors to obtain a value after multiplication and modulo.

Specifically, in the aforementioned steps, the sliding window factors may be a corresponding binary sequence in each sliding window in the sliding window sequence, after sliding window processing has been performed on a key to obtain a sliding window sequence of the key. If a sliding window length in the scrambled sliding window sequence does not exceed a predetermined value, sliding window factors in the scrambled sliding window sequence are extracted, and modular squaring processing and modular multiplication processing are performed on the sliding window factors to obtain a value after multiplication and modulo.

As shown in FIG. 7B, if the sliding window length exceeds the predetermined value, method 700 moves to step S708 to perform modular squaring processing on bits having a bit value of 0 in a sliding window to obtain a value after squaring and modulo. After this, method 700 moves to step S710. In step S710, if the value after squaring and modulo exceeds a second predetermined threshold, method 700 adjusts the sliding window length. Following this, method 700 moves to step S712 to return to perform the scrambling processing on the sliding window sequence with which the sliding window length is adjusted.

Specifically, in the aforementioned steps, after sliding window processing is performed on a key to obtain a sliding window sequence of the key, it is judged whether a sliding window length in the scrambled sliding window sequence exceeds a predetermined value. If the sliding window length exceeds the predetermined value, modular squaring processing is performed on bits having a bit value of 0 in a sliding window to obtain a value after squaring and modulo. If the value after squaring and modulo exceeds a second predetermined threshold, the sliding window length is adjusted, and the flow returns to perform the scrambling processing on the sliding window sequence with which the sliding window length is adjusted. By means of the aforementioned embodiment, sliding window processing based on a blinded sequence is performed on a key, so as to enhance the security of the key.

Figure 8:
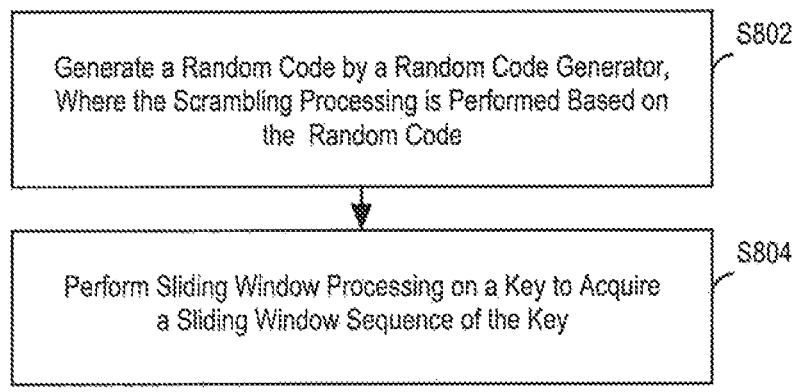
FIG. 8 is a flow chart illustrating an example of a method 800 of acquiring a sliding window sequence of a key in accordance with the present invention.

FIG. 8 shows a flow chart that illustrates an example of a method 800 of acquiring a sliding window sequence of a key in accordance with the present invention. Method 800 can be used to implement step 302. As shown in FIG. 8, method 800 begins at step S802 by generating a random code by a random code generator, where the scrambling processing is performed based on the random code. After this, method 800 moves to step S804 to perform sliding window processing on a key to acquire a sliding window sequence of the key.

Specifically, in the aforementioned step, the random code generator may be a sequence generator for a random code, and in an alternative embodiment, the random code generator may be a PN sequence generator. Before sliding window processing is performed on a key to acquire a sliding window sequence of the key, first, a random code needs to be generated by a random code generator, and parameters for adjusting the sliding window sequence of the key are determined according to the random code, so as to adjust the sliding window sequence of the key using the adjustment parameters to obtain a blinded sliding window sequence. Then sliding window processing is performed on the key. By means of the aforementioned embodiment, parameters for adjusting a sliding window sequence are determined using a random code, so as to achieve the purpose of randomly adjusting the distribution of a sliding window length sequence.

Figure 9:
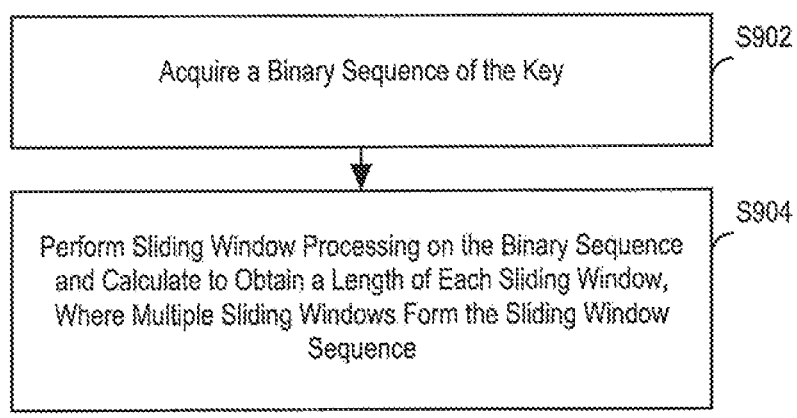
FIG. 9 is a flow chart illustrating an example of a method 900 of acquiring a sliding window sequence of a key in accordance with the present invention.

FIG. 9 shows a flow chart that illustrates an example of a method 900 of acquiring a sliding window sequence of a key in accordance with the present invention. Method 900 can be used to implement step S302. As shown in FIG. 9, method 900 begins at step S902 by acquiring a binary sequence of the key. After this, method 900 moves to step S904 to perform sliding window processing on the binary sequence and calculate to obtain a length of each sliding window, where multiple sliding windows form the sliding window sequence.

Specifically, in the aforementioned steps, the aforementioned key may be a parameter input in an algorithm for converting a plaintext into a ciphertext or converting a ciphertext into a plaintext, and can be categorized into a symmetric key and an asymmetric key. In an alternative embodiment, the key may be an exponent for modular exponentiation of a transmitted signal in an RSA encryption algorithm. In the case that sliding window processing is performed on the key using a "sliding window algorithm," a window of a certain size is usually used to slide on a binary power exponent.

Therefore, first, the key needs to be represented in the form of a binary sequence. Afterwards, sliding window processing is performed on the binary sequence according to a set sliding window length upper limit value, so as to obtain multiple effective sliding windows. Then statistics are collected on window length values in these effective sliding windows to constitute a sliding window sequence of the key. Through the aforementioned implementation, the purpose of acquiring a sliding window sequence of the key is achieved.

Figure 10:
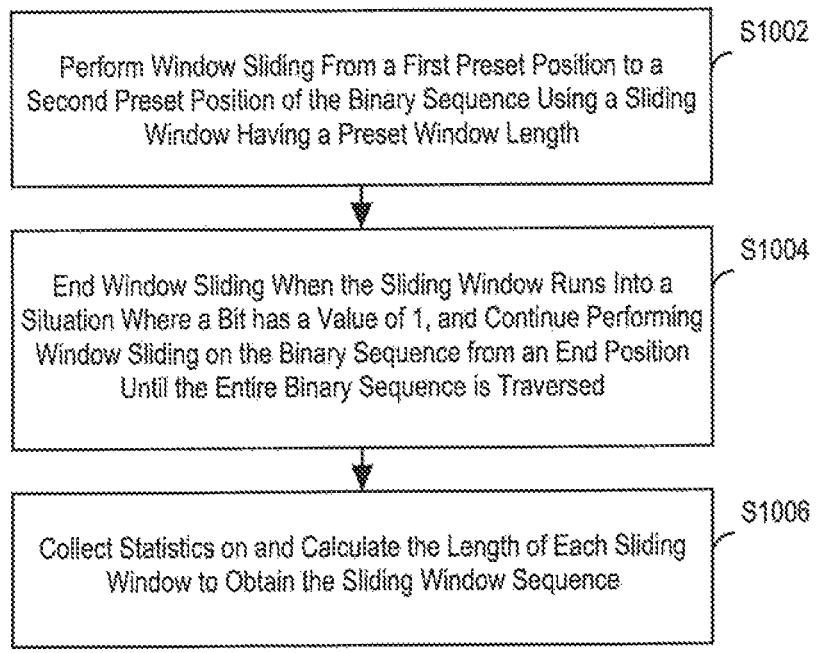
FIG. 10 is a flow chart illustrating an example of a method 1000 to perform sliding window processing on the binary sequence and calculate to obtain an effective sliding window length sequence in accordance with the present invention.

FIG. 10 shows a flow chart that illustrates an example of a method 1000 to perform sliding window processing on the binary sequence and calculate to obtain an effective sliding window length sequence in accordance with the present invention. Method 1000 can be used to implement step S904. As shown in FIG. 10, method 1000 begins with step S1002 by performing window sliding from a first preset position to a second preset position of the binary sequence using a sliding window having a preset window length.

Following this, method 1000 moves to step S1004 to end window sliding when the sliding window runs into a situation where a bit has value of 1, and continue performing window sliding on the binary sequence from an end position until the entire binary sequence is traversed. Next, method

1000 moves to step S1006 to collect statistics on and calculate a length of each sliding window to obtain the sliding window sequence.

Specifically, in the aforementioned steps, during sliding window processing of the binary sequence of the key, first, window sliding is performed from a first preset position to a second preset position of the binary sequence using a sliding window having a preset window length. In an alternative embodiment, a window having a fixed length/size may be used to slide on the binary sequence of the key from left to right (or from right to left).

The sliding process ends when the rightmost side of the window first meets "1", and then a window is created to slide for another time from the place where the last sliding ends until there is no "1" in the binary sequence, so as to obtain multiple effective windows, and a sequence that includes binary digits in these effective windows is the sliding window sequence of the key.

It should be noted that the following four solutions are generally adopted in the prior art to resist SPA attacks: (1) implement both algorithms "modular squaring" and "modular multiplication" involved in an RSA algorithm by a modular multiplier; (2) design a modular multiplier and a modular squarer having the same power consumption; (3) add a redundant module for power disturbance; and (4) improve (for example, perform sliding window processing on) a specific step of an RSA algorithm.

As compared with the aforementioned four solutions, the present invention achieves the following technical effects. First, as compared with the first solution, the present invention retains a "modular squaring" algorithm in an RSA algorithm, which does not affect the computational speed of the algorithm.

Second, as compared with the second solution, since the present invention can ensure that the number of sliding windows in a scrambled sliding window sequence is equal to the number of windows in an original sliding window sequence, the effect of blinding the sliding window sequence can be ensured without increasing the original power consumption and time delay.

Third, as compared with the third solution, the present invention does not adopt a redundant module, and therefore the problem of introducing higher power consumption and bringing about more spurious noise, affecting signal integrity does not occur. Fourth, as compared with fourth solution, the present invention changes an effective window length sequence in sliding window processing, thereby further improving the security of a key.

Figure 11:
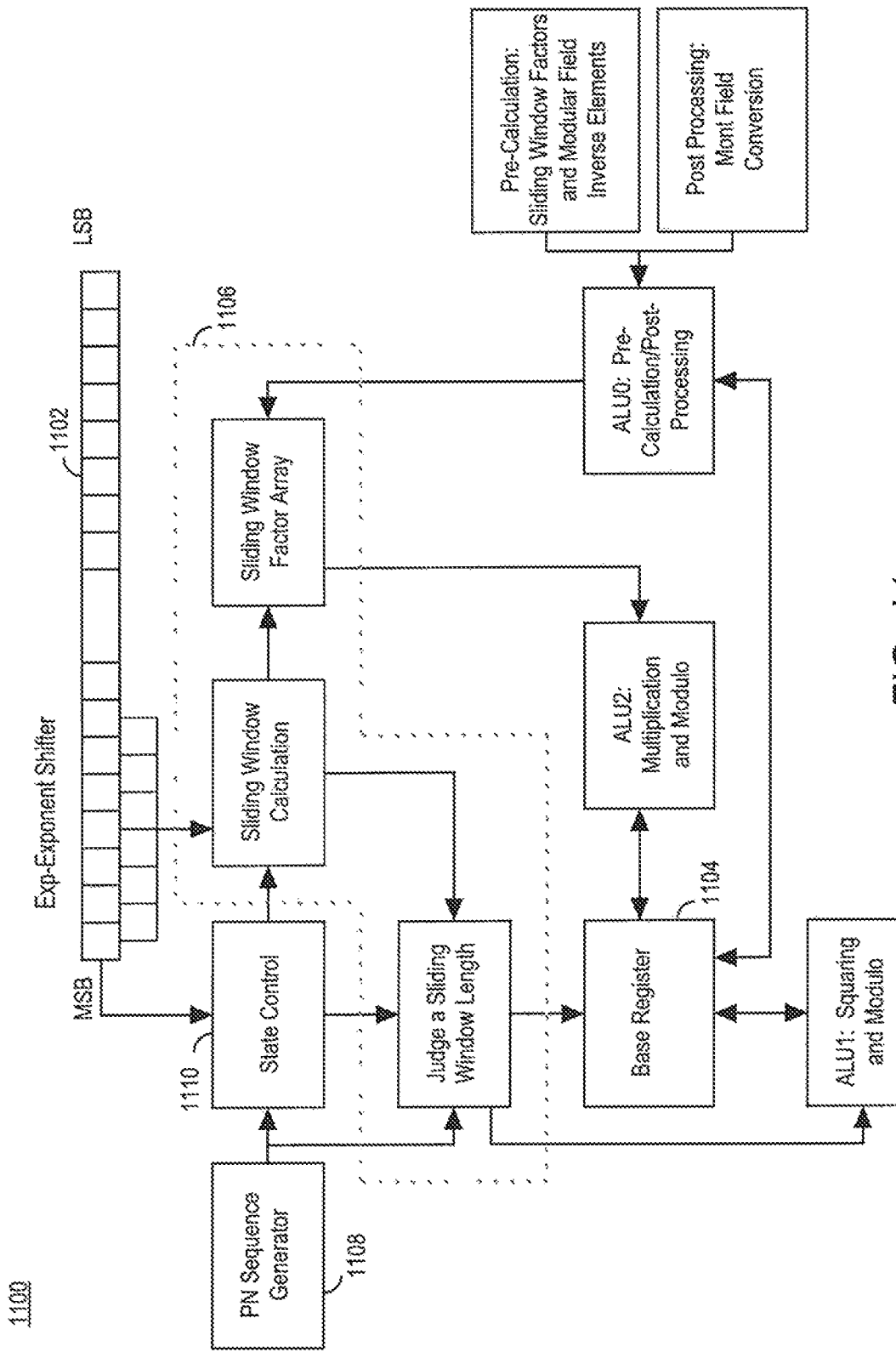
FIG. 11 is a block diagram illustrating an example of a preferred RSA hardware structure 1100 based on "sliding window processing" in accordance with the present invention.

FIG. 11 shows a block diagram that illustrates an example of a preferred RSA hardware structure 1100 based on "sliding window processing" in accordance with the present invention. As shown in FIG. 11, structure 1100 includes an exponent register 1102 that holds an exponent, and a base register 1104 that stores a number of intermediate and final calculations.

As further shown in FIG. 11, structure 1100 also includes arithmetic logic units ALU0, ALU1, and ALU2. ALU0 is configured to perform a pre-processing/post-processing step, and arithmetic logic units ALU1 and ALU2 are configured to perform formal calculation steps, where ALU1 is configured to perform a squaring and modulo step, and ALU2 is configured to perform a multiplication and modulo step. The Montgomery modular multiplier may be an arithmetic device configured to perform a Montgomery modular multiplication algorithm, which can obtain a result of a modular multiplication operation without using division (by a shift operation).

In addition, structure 1100 includes a processing system 1106 which includes one or more processors that are coupled to exponent register 1102, base register 1104, ALU0, ALU1, and ALU2. Processing system 1106 executes the code of a number of software modules. The softward modules include an exponent shifter module that performs sliding window traversal from a most significant bit (MSB) to a least significant bit (LSB) of a binary sequence of the exponent.

The software modules also include a sliding window module that performs a number of sliding window operations, including calculating a sliding window length and an effective sliding window length sequence, correcting the sliding windows, judging the length of the sliding windows, extracting sliding window factors, and adjusting the sliding window lengths.

The scrambling processing is performed on the effective sliding window length sequence according to a random code to obtain a scrambled sliding window sequence, and the scrambled sliding window sequence is traversed. Post-processing is performed on the scrambled sliding window sequence using a Montgomery modular multiplier.

As additionally shown in FIG. 11, structure 1100 also includes a PN sequence generator 1108 that generates a random code. PN sequence generator 1108 provides the random code that is used to obtain the scrambled sliding window sequence. PN sequence generator 1108 can be implemented in logic using well-known approaches, or as a software module which is executed by processing system 1106.

Structure 1100 further includes a state machine 1110 that controls the operation of hardware structure 1100. State machine 1110 can be implemented in logic using well-known approaches, or as a software module which is executed by processing system 1106.

Figure 12:
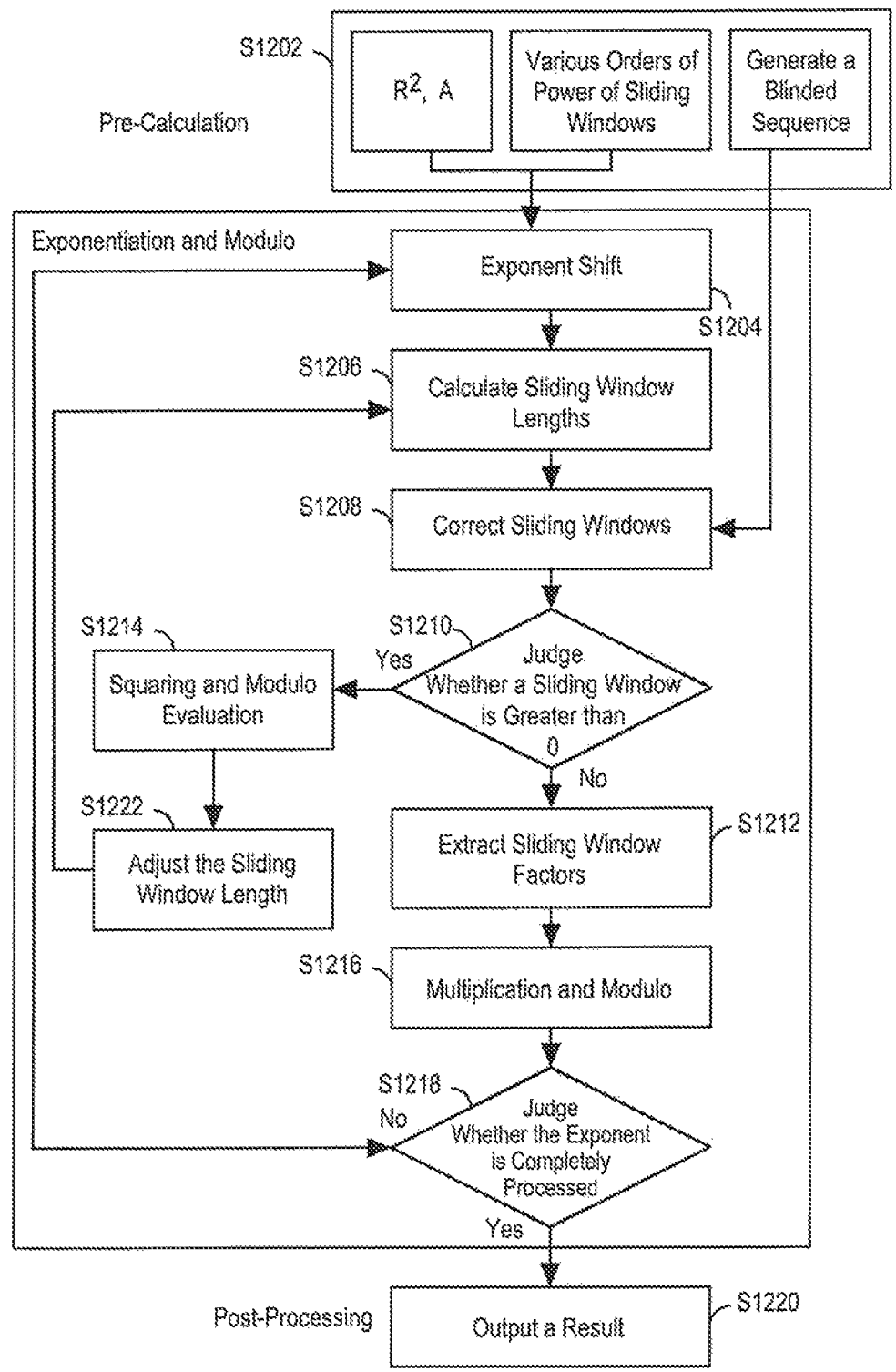
FIG. 12 is a flow chart illustrating an example of a preferred RSA computation method 1200 based on "sliding window processing" in accordance with the present invention.

FIG. 12 shows a flow chart that illustrates an example of a preferred RSA computation method 1200 based on "sliding window processing" in accordance with the present invention. Method 1200 can describe the operation of structure 1100. As shown in FIG. 12, method 1200 begins with step 1202 by pre-calculating R2 and A and various orders of power of sliding windows, and generating a blinded sequence. Specifically, in the aforementioned step, calculation is performed according to R2=MMM(R*R, R) and A=MMM(Ain, R2) to obtain R2 and A and various orders of power of sliding windows, and a blinded sequence is generated.

Following this, method 1200 moves to step S1204 to exponent shift. Specifically, in the aforementioned step, sliding window traversal is performed on exponent P in order from the MSB to the LSB. Next, method 1200 moves to step S1206 to calculate sliding window lengths. Specifically, in the aforementioned step, the total number of effective sliding windows is counted and denoted by n, and a corresponding effective sliding window length sequence is calculated as L={L0, L1, L2, L3, . . . , Ln}.

After this, method 1200 moves to step S1208 to correct/adjust the sliding windows. Specifically, in the aforementioned step, adjustment parameters of a sliding window sequence are determined using a random code generated by a random code generator, and the original sliding window sequence is adjusted using the determined adjustment parameters.

After the sliding windows have been corrected/adjusted, method 1200 moves to step S1210 to judge whether a sliding window length is greater than 0. Specifically, in the aforementioned step, it is judged whether a sliding window length in the adjusted sliding window sequence is greater than 0, and if the sliding window length is not greater than 0, step S1212 is performed; otherwise, step S1214 is performed.

In step S1212, method 1200 extracts sliding window factors. Specifically, in the aforementioned step, if the sliding window length in the adjusted sliding window sequence is not greater than 0, sliding window factors in the adjusted sliding window sequence are extracted.

Once the sliding window factors have been extracted, method 1200 moves to step S1216 to perform multiplication and modulo. Specifically, in the aforementioned step, after the sliding window factors in the adjusted sliding window sequence are extracted, modular squaring processing and modular multiplication processing are performed on the sliding window factors to obtain a value after multiplication and modulo.

Following this, method 1200 moves to step S1218 to judge whether the exponent is completely processed. Specifically, in the aforementioned step, it is judged whether sliding window traversal is completely performed on exponent P in order from the MSB to the LSB. When the exponent is completely processed, method 1200 moves to step S1220 to output a result. When the exponent is not completely processed, method 1200 returns to step S1204. Specifically, in the aforementioned step, calculation is performed according to Result=MMM(B, 1) to obtain a final result.

When the sliding window length is greater than zero in step 1210, method 1200 moves to step S1214 to perform squaring and modulo evaluation. Specifically, in the aforementioned step, if the sliding window length in the adjusted sliding window sequence is greater than 0, a squaring and modulo evaluation operation is performed.

After this, method 1200 moves to step S1222 to adjust the sliding window length. Specifically, in the aforementioned step, the sliding window length is adjusted, and the flow returns to perform the scrambling processing on the sliding window sequence with which the sliding window length is adjusted.

It should be noted that during an exponentiation and modulo operation, an intermediate result of each iteration is saved into base register 1104, which is specifically performed according to the following steps. First, perform sliding window traversal on the power exponent in order from the MSB to the LSB, where the total number of effective sliding windows is denoted by n, and calculate a corresponding effective sliding window length sequence L={L0, L1, L2, L3, . . . , Ln}.

Second, adjust the effective sliding window length sequence L according to an output of a PN sequence generator. Begin by obtaining an initial increase/decrease direction from a PN sequence. After this, perform increase/decrease adjustment on Li according to a current value of the PN sequence.

Next, if a difference between the number of non-zero-length effective windows after adjustment and the number before adjustment is greater than a threshold, reverse the increase/decrease direction, and repeat the correction step (2.2) once for Li. Following this, repeat the aforementioned steps until all sequences are completely corrected, where the adjusted effective sliding window length sequence L={L0, L1, L2, L3, . . . , Lm}.

Third, after adjusting the effective sliding window length sequence, traverse each effective sliding window Li in turn (i=0, 1, 2 . . . m), where each bit in Li corresponds to one operation B=SQR(B), and each Li corresponds to one operation B=MMM(B, A) after Li ends.

It can be seen based on the solution disclosed in the aforementioned steps S1202 to S1222 that, the advantage of the aforementioned embodiment of the present application over the classical method is that for a power exponent P and a sliding window length upper limit that are given, an effective sliding window length sequence thereof cannot be uniquely determined, and the distribution of the sliding window length sequence is randomly adjusted by blinding the sequence.

A smart network card is further provided according to an embodiment of the present invention. The smart network card includes a key obtained by the alternative or preferred key processing method according to any one of the aforementioned items.

It should be noted that in order to briefly describe each foregoing method, all the methods are expressed as a combination of a series of actions, but those skilled in the art should know that the present invention is not limited by the sequence of the described actions because certain steps can adopt other sequences or can be carried out at the same time according to the present invention. Secondly, those skilled in the art should also know that all the embodiments described in the description belong to preferred embodiments, and the involved actions and modules are not necessarily required by the present invention.

Through the preceding description of the embodiments, those skilled in the art can clearly understand that the method according to the aforementioned embodiment may be implemented by software plus a necessary general hardware platform, and certainly may also be implemented by hardware. In most cases, however, the former is a preferred implementation mode.

Based on such understanding, the essence of the technical solutions of the present invention or the part that makes contributions to the prior art may be embodied in the form of a software product. The computer software product is stored in a storage medium (for example, a ROM/RAM, a magnetic disk, or an optical disk) and includes several instructions for instructing a terminal apparatus (which may be a mobile phone, a computer, a server, a network apparatus, or the like) to perform the methods described in the embodiments of the present invention.

Figure 13:
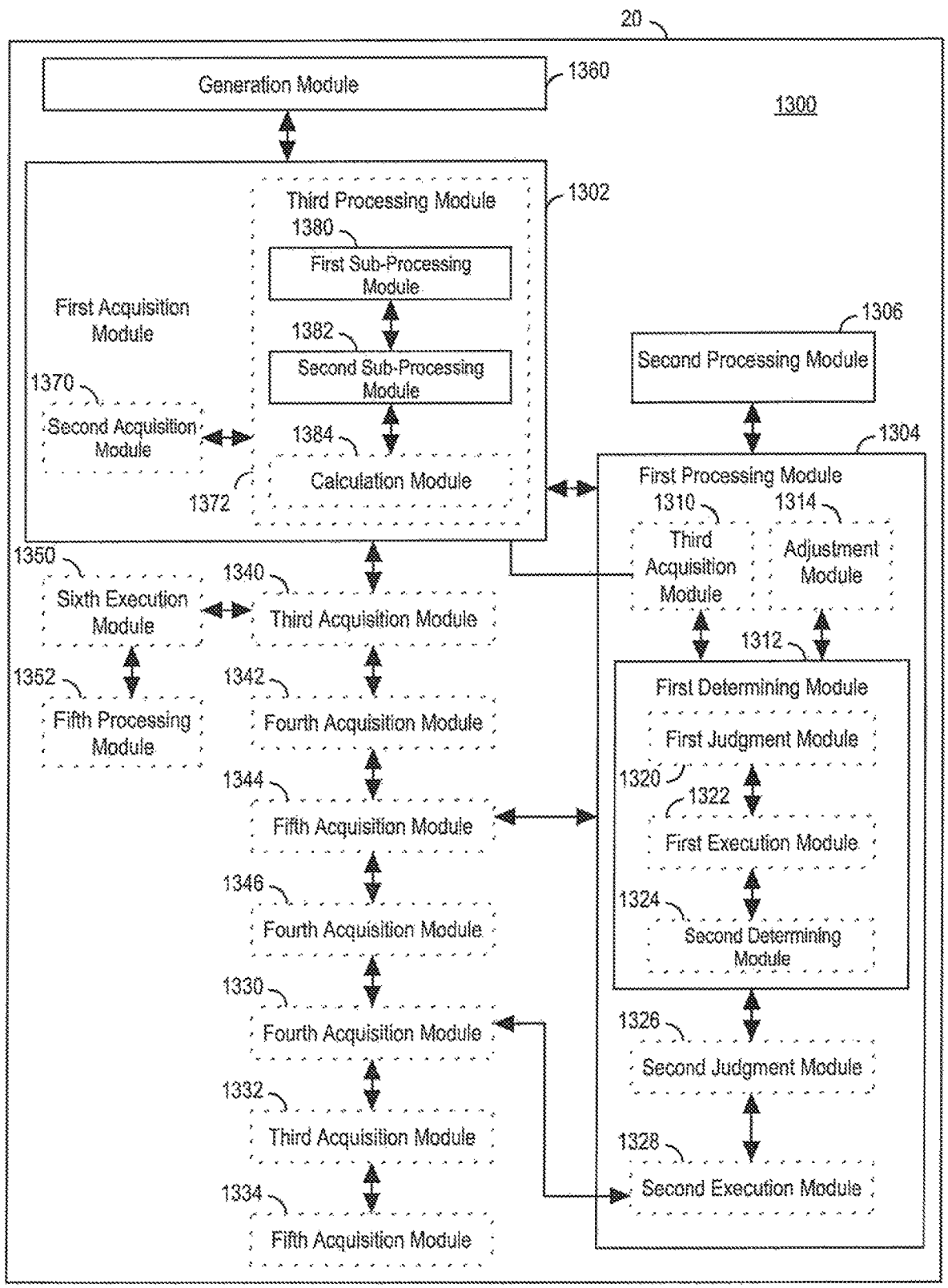
FIG. 13 is a diagram illustrating an example of a key processing device 1300 in accordance with the present invention.

A device for implementing the aforementioned key processing method is further provided according to an embodiment of the present invention. FIG. 13 is a diagram that illustrates an example of a key processing device 1300 in accordance with the present invention. As shown in FIG. 13, device 1300 includes a first acquisition module 1302, a first processing module 1304, and a second processing module 1306.

First acquisition module 1302 is configured to acquire a sliding window sequence of a key, where the sliding window sequence includes multiple sliding windows obtained after sliding window processing is performed on the key. First processing module 1304 is configured to perform scrambling processing on at least one sliding window in the sliding window sequence to obtain a scrambled sliding window sequence.

Second processing module 1306 is configured to traverse the scrambled sliding window sequence, and to perform post-processing on the scrambled sliding window sequence using a Montgomery modular multiplier. It should be noted herein that first acquisition module 1302, first processing module 1304, and second processing module 1306 may correspond to step S302 through step S306, and the example and application scenario for implementing the three modules are the same as those of the corresponding steps, but are not limited to the contents disclosed in the aforementioned embodiments.

In view of the above, sliding window processing is performed on a binary sequence of a key, and statistics are collected on an effective sliding window length sequence obtained by performing sliding window processing on the key to obtain a sliding window sequence of the key. After this, a scrambling code is added into the obtained sliding window sequence for blinding, where in an alternative embodiment, a pseudo-random scrambling code may be added into an exponent control operation sequence (namely, a sliding window sequence) of an RSA encryption algorithm.

Finally, post-processing is performed on the scrambled sliding window sequence using a Montgomery modular multiplier, so that the purpose of changing the effective window length sequence and distribution that are obtained by performing sliding window processing on the key while increasing the original power consumption and time delay is achieved, so as to realize the technical effect of improving the security of the key. Therefore, the present invention solves the technical problem that an existing RSA encryption algorithm based on "sliding window processing" is vulnerable to SPA attacks.

In addition, as shown in FIG. 13, first processing module 1304 includes a third acquisition module 1310 which is configured to acquire a random code, a first determining module 1312 which is configured to determine adjustment parameters according to the random code, where the adjustment parameters include an adjustment tendency and an adjustment length, and an adjustment module 1314 which is configured to adjust a window length of one or more sliding windows in the sliding window sequence using the adjustment parameters, so as to obtain a scrambled sliding window sequence.

It should be noted herein that the third acquisition module 1310, the first determining module 1312, and the adjustment module 1314 may correspond to step S502 through step S506, and the example and application scenario for implementing the three modules are the same as those of the corresponding steps, but are not limited to the contents disclosed in the aforementioned embodiments.

Further, as shown in FIG. 13, first determining module 1312 includes a first judgment module 1320 which is configured to judge whether a value of the random code satisfies a preset condition, a first execution module 1322 which is configured to, if the value of the random code satisfies the preset condition, determine that the adjustment tendency is increasing a sliding window length or decreasing a sliding window length, and a second determining module 1324 which is configured to determine an adjustment length corresponding to the random code according to a range that the value of the random code is in.

It should be noted herein that the first judgment module 1320, the first execution module 1322, and the second determining module 1324 may correspond to step S602 through step S606, and the example and application scenario for implementing the three modules are the same as those of the corresponding steps, but are not limited to the contents disclosed in the aforementioned embodiments.

As further shown in FIG. 13, first processing module 1304 further includes a second judgment module 1326 which is configured to judge whether the adjustment parameters satisfy at least one of the following conditions: condition 1: the adjustment length does not exceed a window length of a sliding window; and condition 2: a corresponding sliding window exists at an adjustment position determined by the adjustment length.

First processing module 1304 also includes a second execution module 1328 which is configured to, if any one or more of the conditions is satisfied, allow to adjust the sliding window sequence using the adjustment parameters.

It should be noted herein that the second judgment module 1326 and the second determining module 1328 may correspond to step S608 through step S610, and the example and application scenario for implementing the two modules are the same as those of the corresponding steps, but are not limited to the contents disclosed in the aforementioned embodiments.

As additionally shown in FIG. 13, device 1300 further includes a fourth acquisition module 1330 which is configured to acquire a difference between the number of windows in the sliding window sequence and the number of sliding windows in the scrambled sliding window sequence, a third execution module 1332 which is configured to, if the difference exceeds a first predetermined threshold, modify the adjustment tendency, and a fifth acquisition module 1334 which is configured to redetermine an adjustment length of the random code based on the modified adjustment tendency, so as to obtain corrected adjustment parameters.

It should be noted herein that the fourth acquisition module 1330, the third execution module 1332, and the fifth acquisition module 1334 may correspond to step S902 through step S906, and the example and application scenario for implementing the three modules are the same as those of the corresponding steps, but are not limited to the contents disclosed in the aforementioned embodiments.

Further, as shown in FIG. 13, device 1300 further includes a third judgment module 1340 which is configured to judge whether a sliding window length in the scrambled sliding window sequence exceeds a predetermined value, a fourth execution module 1342 which is configured to, if the sliding window length exceeds the predetermined value, perform modular squaring processing on bits having a bit value of 0 in a sliding window to obtain a value after squaring and modulo, a fifth execution module 1344 which is configured to, if the value after squaring and modulo exceeds a second predetermined threshold, adjust the sliding window length, and a fourth processing module 1346 which is configured to return to perform the scrambling processing on the sliding window sequence with which the sliding window length is adjusted.

It should be noted herein that the third judgment module 1340, the fourth execution module 1342, the fifth execution module 1344, and the fourth processing module 1346 may correspond to step S702 and step S708 through step S712, and the example and application scenario for implementing the four modules are the same as those of the corresponding steps, but are not limited to the contents disclosed in the aforementioned embodiments.

As further shown in FIG. 13, device 1300 further includes a sixth execution module 1350 which is configured to, if the sliding window length does not exceed the predetermined value, extract sliding window factors in the scrambled sliding window sequence, and a fifth processing module 1352 which is configured to perform the modular squaring processing and modular multiplication processing on the sliding window factors to obtain a value after multiplication and modulo.

It should be noted herein that the sixth execution module 1350 and the fifth processing module 1352 may correspond to step S702 through step S706, and the example and application scenario for implementing the two modules are the same as those of the corresponding steps, but are not limited to the contents disclosed in the aforementioned embodiments.

As additionally shown in FIG. 13, device 1300 further includes a generation module 1360 which is configured to generate a random code by a random code generator, where the scrambling processing is performed based on the random code.

It should be noted herein that the generation module 1360 may correspond to step S802, and the example and application scenario for implementing the module are the same as those of the corresponding step, but are not limited to the contents disclosed in the aforementioned embodiments. It should be noted that the aforementioned modules, as part of the device, may operate on a computer terminal 20.

Further, as shown in FIG. 13, first acquisition module 1302 includes a second acquisition module 1370 which is configured to acquire a binary sequence of the key, and a third processing module 1372 which is configured to perform sliding window processing on the binary sequence and calculate to obtain a length of each sliding window, where multiple sliding windows form the sliding window sequence.

It should be noted herein that the second acquisition module 1370 and the third processing module 1372 may correspond to step S902 through step S904, and the example and application scenario for implementing the two modules are the same as those of the corresponding steps, but are not limited to the contents disclosed in the aforementioned embodiments.

As shown in FIG. 13, third processing module 1372 includes a first sub-processing module 1380 which is configured to perform window sliding from a first preset position to a second preset position of the binary sequence using a sliding window having a preset window length, a second sub-processing module 1382 which is configured to end window sliding when the sliding window runs into a situation where a bit has a value of 1, and continue performing window sliding on the binary sequence from an end position until the entire binary sequence is traversed, and a calculation module 1384 which is configured to collect statistics on and calculate a length of each sliding window to obtain the sliding window sequence.

It should be noted herein that the first sub-processing module 1380, the second sub-processing module 1384, and the calculation module 1386 may correspond to step S1002 through step S1006, and the example and application scenario for implementing the three modules are the same as those of the corresponding steps, but are not limited to the contents disclosed in the aforementioned embodiments.

An embodiment of the present invention may provide a computer terminal, where the computer terminal may be any computer terminal apparatus in a computer terminal group. In an embodiment, the computer terminal may also be replaced with a terminal apparatus such as a mobile terminal. In an embodiment, the computer terminal may be at least one network apparatus in multiple network apparatuses located in a computer network.

Figure 14:
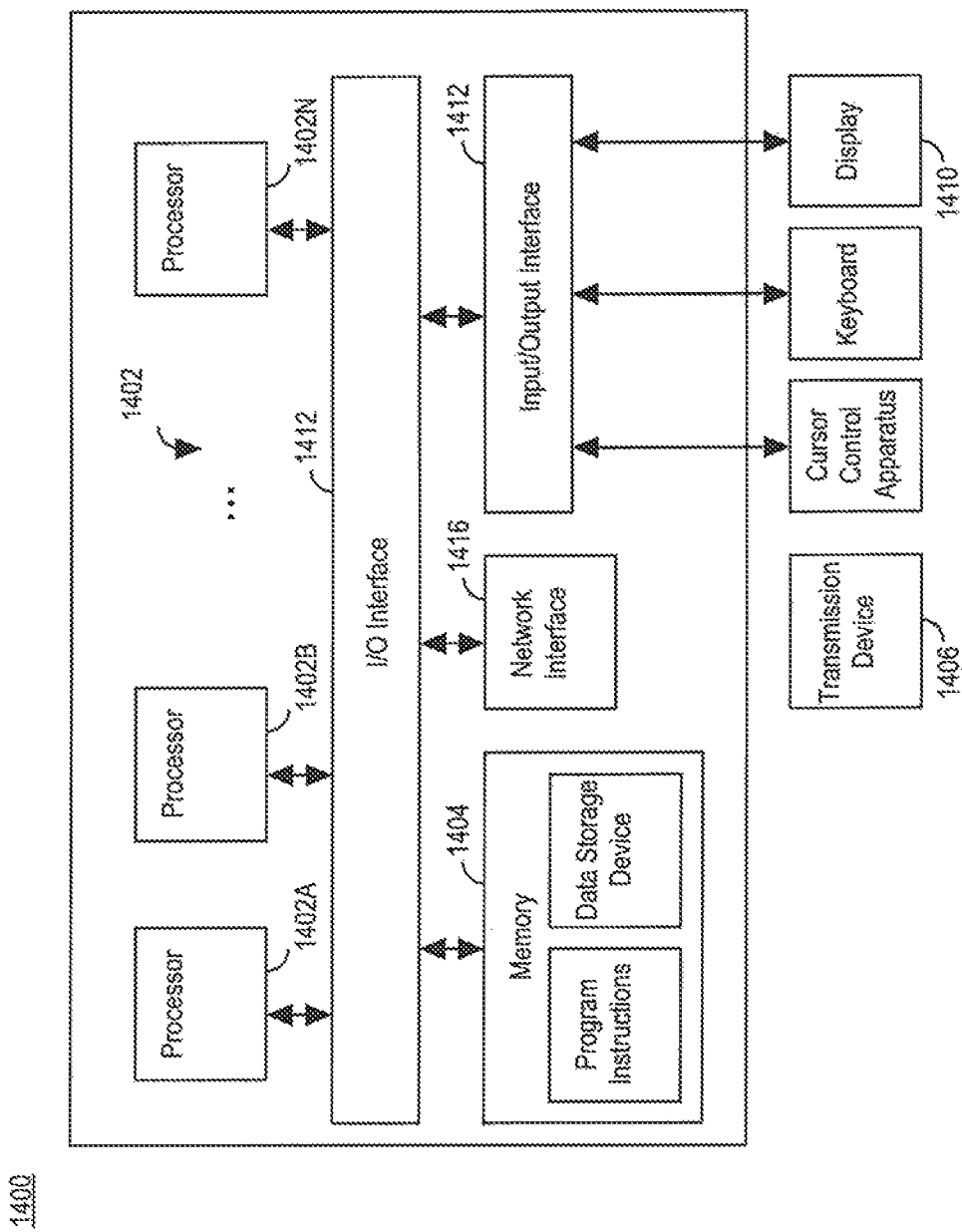
FIG. 14 is a block diagram illustrating an example of a hardware structure of a computer terminal 1400 in accordance with the present invention.

FIG. 14 is a block diagram illustrating an example of a hardware structure of a computer terminal 1400 in accordance with the present invention. As shown in FIG. 14, computer terminal 1400 may include one or more processors 1402 (shown as 1402A, 1402B, . . . , 1402n in the figure). (The processors 1402 may include, but are not limited to, a processing device such as a microprocessor (MCU) or a programmable logic device (FPGA)), a memory 1404 configured to store data, and a transmission device 1406 configured to implement a communication function.

In addition, the computer terminal 1400 may further include a display 1410, an input/output interface (I/O interface) 1412, a universal serial bus (USB) port (which may be included as one of ports of the I/O interface), a network interface 1416, a power source and/or a camera. Those of ordinary skilled in the art can understand that the structure shown in FIG. 14 is merely exemplary and does not constitute limitation to the structure of the aforementioned electronic device. For example, the computer terminal 1400 may further include more or fewer components than those shown in FIG. 14, or have a different configuration from that shown in FIG. 14.

It should be noted that the aforementioned one or more processors 1402 and/or other data processing circuits may usually be referred to as "data processing circuits" in this text. The data processing circuit may be fully or partially embodied as software, hardware, firmware, or any other combination. In addition, the data processing circuit may be a single independent processing module or fully or partially combined into any of other elements of the computer terminal 1400. As concerned in the embodiment of the present application, the data processing circuit controls (for example, selection of a path of a terminal with variable resistance connected to an interface) as a processor.

Processor 1402 may invoke, through transmission device 1406, information and an application stored in the memory to perform the following steps: acquiring a sliding window sequence of a key, where the sliding window sequence includes multiple sliding windows obtained after sliding window processing is performed on the key; performing scrambling processing on at least one sliding window in the sliding window sequence to obtain a scrambled sliding window sequence; and traversing the scrambled sliding window sequence, and performing post-processing on the scrambled sliding window sequence using a Montgomery modular multiplier.

Memory 1404 may be configured to store software programs of application software and modules, for example, program instructions corresponding to the key processing method in the embodiment of the present invention/a data storage device, and the processor 1402 runs the software programs and the modules stored in memory 1404 to execute various function applications and data processing, namely, implement the key processing method of the aforementioned application.

Memory 1404 may include a high-speed random access memory, and may further include a non-volatile memory, for example, one or more magnetic storage devices, a flash memory, or another non-volatile solid-state memory. In some examples, memory 1404 may further include memories disposed remotely from processor 1402, and these remote memories may be connected to the computer terminal 1400 through a network. Examples of the aforementioned network include, but are not limited to, an internet, an intranet, a local area network, a mobile communication network, and a combination thereof.

Transmission device 1406 is configured to receive or send data through a network. A specific example of the aforementioned network may include a wireless network provided by a communication provider of computer terminal 1400. In one example, transmission device 1406 includes a network adapter (network interface controller, NIC), which may be connected to other network apparatuses through a base station so as to communicate with an internet. In one example, transmission device 1406 may be a radio frequency (RF) module, which is configured to communicate with an internet in a wireless manner.

Display 1410 may be, for example, a touch-screen liquid crystal display (LCD), and the liquid crystal display can enable a user to interact with a user interface of computer terminal 1400.

It should be noted herein that in some alternative embodiments, computer terminal 1400 shown in FIG. 14 may include hardware elements (including circuits), software elements (including computer code stored on a computer readable medium), or a combination of hardware elements and software elements. It should be pointed out that FIG. 14 is merely one example of a specific example, and intended to show the types of parts that can exist in computer terminal 1400.

In this embodiment, computer terminal 1400 may execute program code of the following steps in the key processing method of the application: acquiring a sliding window sequence of a key, where the sliding window sequence includes multiple sliding windows obtained after sliding window processing is performed on the key; performing scrambling processing on at least one sliding window in the sliding window sequence to obtain a scrambled sliding window sequence; and traversing the scrambled sliding window sequence, and performing post-processing on the scrambled sliding window sequence using a Montgomery modular multiplier.

In an embodiment, processor 1402 may further execute program code of the following steps: acquiring a random code; determining adjustment parameters according to the random code, where the adjustment parameters include an adjustment tendency and an adjustment length; and adjusting a window length of one or more sliding windows in the sliding window sequence using the adjustment parameters, so as to obtain a scrambled sliding window sequence.

In an embodiment, processor 1402 may further execute program code of the following steps: judging whether a value of the random code satisfies a preset condition; if the value of the random code satisfies the preset condition, determining that the adjustment tendency is increasing a sliding window length or decreasing a sliding window length; and determining an adjustment length corresponding to the random code according to a range that the value of the random code is in.

In an embodiment, processor 1402 may further execute program code of the following steps: judging whether the adjustment parameters satisfy at least one of the following conditions: condition 1: the adjustment length does not exceed a window length of a sliding window; and condition 2: a corresponding sliding window exists at an adjustment position determined by the adjustment length; and if any one or more of the conditions is satisfied, allowing to adjust the sliding window sequence using the adjustment parameters.

In an embodiment, processor 1402 may further execute program code of the following steps: acquiring a difference between the number of windows in the sliding window sequence and the number of sliding windows in the scrambled sliding window sequence. If the difference exceeds a first predetermined threshold, modifying the adjustment tendency; and redetermining an adjustment length of the random code based on the modified adjustment tendency, so as to obtain corrected adjustment parameters.

In an embodiment, processor 1402 may further execute program code of the following steps: judging whether a sliding window length in the scrambled sliding window sequence exceeds a predetermined value; if the sliding window length exceeds the predetermined value, performing modular squaring processing on bits having a bit value of 0 in a sliding window to obtain a value after squaring and modulo; if the value after squaring and modulo exceeds a second predetermined threshold, adjusting the sliding window length; and returning to perform the scrambling processing on the sliding window sequence with which the sliding window length is adjusted.

In an embodiment, processor 1402 may further execute program code of the following steps: if the sliding window length does not exceed the predetermined value, extracting sliding window factors in the scrambled sliding window sequence; and performing modular squaring processing and modular multiplication processing on the sliding window factors to obtain a value after multiplication and modulo.

In an embodiment, processor 1402 may further execute program code of the following step: generating a random code by a random code generator, where the scrambling processing is performed based on the random code. In an embodiment, processor 1402 may further execute program code of the following steps: acquiring a binary sequence of the key; and performing sliding window processing on the binary sequence and calculating to obtain a length of each sliding window, where multiple sliding windows form the sliding window sequence.

In an embodiment, processor 1402 may further execute program code of the following steps: performing window sliding from a first preset position to a second preset position of the binary sequence using a sliding window having a preset window length; ending window sliding when the sliding window runs into a situation where a bit has a value of 1, and continuing performing window sliding on the binary sequence from an end position until the entire binary sequence is traversed; and performing statistics on and a length of each sliding window and make a calculation to obtain the sliding window sequence.

Those of ordinary skill in the art can understand that computer terminal 1400 shown in FIG. 14 is merely exemplary, and computer terminal 1400 may also be a terminal apparatus such as a smart phone (for example, an Android phone or an iOS phone), a tablet computer, a palm computer, a mobile Internet device (MID), or a PAD. FIG. 14 does not constitute limitation to the structure of computer terminal 1400. For example, computer terminal 1400 may further include more or fewer components (for example, a network interface or a display device) than those shown in FIG. 14, or have a different configuration from that shown in FIG. 14.

Those of ordinary skill in the art can understand that all or part of the steps in various methods according to the aforementioned embodiments may be implemented by a program instructing relevant hardware of a terminal apparatus. The program may be stored in a computer readable storage medium. The storage medium may include: a flash drive, a read-only memory (ROM), a random access memory (RAM), a magnetic disk, an optical disk, or the like.

An embodiment of the present invention further provides a storage medium. In an embodiment, the storage medium may be configured to store program code executed by the key processing method provided in the aforementioned embodiment. In an embodiment, the storage medium may be located in any computer terminal in a computer terminal group in a computer network, or located in any mobile terminal in a mobile terminal group.

In an embodiment, the storage medium is configured to store program code for performing the following steps: acquiring a sliding window sequence of a key, where the sliding window sequence includes multiple sliding windows obtained after sliding window processing is performed on the key; performing scrambling processing on at least one sliding window in the sliding window sequence to obtain a scrambled sliding window sequence; and traversing the scrambled sliding window sequence, and performing post-processing on the scrambled sliding window sequence using a Montgomery modular multiplier.

In an embodiment, the storage medium is configured to store program code for performing the following steps: acquiring a random code; determining adjustment parameters according to the random code, where the adjustment parameters include an adjustment tendency and an adjustment length; and adjusting a window length of one or more sliding windows in the sliding window sequence using the adjustment parameters, so as to obtain a scrambled sliding window sequence.

In an embodiment, the storage medium is configured to store program code for performing the following steps: judging whether a value of the random code satisfies a preset condition; if the value of the random code satisfies the preset condition, determining that the adjustment tendency is increasing a sliding window length or decreasing a sliding window length; and determining an adjustment length corresponding to the random code according to a range that the value of the random code is in.

In an embodiment, the storage medium is configured to store program code for performing the following steps: judging whether the adjustment parameters satisfy at least one of the following conditions: condition 1: the adjustment length does not exceed a window length of a sliding window; and condition 2: a corresponding sliding window exists at an adjustment position determined by the adjustment length; and if any one or more of the conditions is satisfied, allowing to adjust the sliding window sequence using the adjustment parameters.

In an embodiment, the storage medium is configured to store program code for performing the following steps: acquiring a difference between the number of windows in the sliding window sequence and the number of sliding windows in the scrambled sliding window sequence; if the difference exceeds a first predetermined threshold, modifying the adjustment tendency; and redetermining an adjustment length of the random code based on the modified adjustment tendency, so as to obtain corrected adjustment parameters.

In an embodiment, the storage medium is configured to store program code for performing the following steps: judging whether a sliding window length in the scrambled sliding window sequence exceeds a predetermined value; if the sliding window length exceeds the predetermined value, performing modular squaring processing on bits having a bit value of 0 in a sliding window to obtain a value after squaring and modulo; if the value after squaring and modulo exceeds a second predetermined threshold, adjusting the sliding window length; and returning to perform the scrambling processing on the sliding window sequence with which the sliding window length is adjusted.

In an embodiment, the storage medium is configured to store program code for performing the following steps: if the sliding window length does not exceed the predetermined value, extracting sliding window factors in the scrambled sliding window sequence; and performing modular squaring processing and modular multiplication processing on the sliding window factors to obtain a value after multiplication and modulo.

In an embodiment, the storage medium is configured to store program code for performing the following step: generating a random code by a random code generator, where the scrambling processing is performed based on the random code.

In an embodiment, the storage medium is configured to store program code for performing the following steps: acquiring a binary sequence of the key; and performing sliding window processing on the binary sequence and calculating to obtain a length of each sliding window, where multiple sliding windows form the sliding window sequence.

In an embodiment, the storage medium is configured to store program code for performing the following steps: performing window sliding from a first preset position to a second preset position of the binary sequence using a sliding window having a preset window length; ending window sliding when the sliding window runs into a situation where a bit has a value of 1, and continuing performing window sliding on the binary sequence from an end position until the entire binary sequence is traversed; and performing statistics on and a length of each sliding window and make a calculation to obtain the sliding window sequence.

The aforementioned sequence numbers of the embodiments of the present invention are merely for the convenience of description, and do not imply the preference among the embodiments.

In the aforementioned embodiments of the present invention, the description of each embodiment has its own emphasis, and for a part that is not detailed in a certain embodiment, reference can be made to the relevant description of other embodiments.

In a few embodiments provided in the present application, it should be understood that the disclosed technical contents may be implemented in other manners. The device embodiments described above are merely exemplary. For example, the division of units is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces, and the indirect couplings or communication connections between units or modules may be implemented in electrical or other forms.

The units described as separate parts may be or may not be physically separate, and the parts shown as units may be or may not be physical units, and not only can be located in one place, but also can be distributed onto a plurality of network units. Part or all of the units can be chosen to implement the purpose of the embodiment schemes according to actual requirements.

In addition, respective functional units in respective embodiments of the present invention may be integrated into one processing unit, or respective units may physically exist alone, or two or more units may be integrated into one unit. The integrated unit can be implemented in the form of hardware or in the form of a software functional unit.

When being implemented in the form of a software functional unit and sold or used as a separate product, the integrated unit may be stored in a computer readable storage medium. Based on such understanding, the essence of the technical solutions of the present invention, or the part that makes contributions to the prior art, or all or part of the technical solutions may be embodied in the form of a software product. The computer software product is stored in a storage medium and includes several instructions for instructing a computer apparatus (which may be a personal computer, a server, a network apparatus, or the like) to perform all or part of the steps in the methods described in the embodiments of the present invention. The foregoing storage medium includes: various media capable of storing program code, such as a USB flash drive, a read-only memory (ROM), a random access memory (RAM), a mobile hard disk, a magnetic disk, or an optical disk.

The above descriptions are merely preferred embodiments of the present invention. It should be pointed out that those of ordinary skill in the art can make several improvements and modifications without departing from the principle of the present invention, and the improvements and modifications should also be construed as falling within the protection scope of the present invention.

What is claimed is:

1. A method for processing a key, comprising:
   acquiring a sliding window sequence of the key by performing a sliding window traversal on the key, the sliding window sequence including a plurality of sliding windows;
   scrambling one or more sliding windows in the sliding window sequence acquired from performance of the sliding window traversal on the key to obtain a scrambled sliding window sequence that represents a randomly changed distribution of the one or more sliding windows relative to the sliding window sequence; and
   traversing the scrambled sliding window sequence, and Montgomery modular multiplying the scrambled sliding window sequence.

2. The method of claim 1, wherein the scrambling one or more sliding windows includes:
   acquiring a random code;
   determining adjustment parameters based on the random code, the adjustment parameters including an adjustment tendency and an adjustment length; and
   adjusting a window length of the one or more sliding windows in the sliding window sequence based on the adjustment parameters so as to obtain the scrambled sliding window sequence.

3. The method of claim 2, wherein the determining the adjustment parameters based on the random code includes:
   judging whether a value of the random code satisfies a preset condition;
   if the value of the random code satisfies the preset condition, determining whether the adjustment tendency is increasing a sliding window length or decreasing the sliding window length; and
   determining an adjustment length based on the random code according to a range that the value of the random code is in.

4. The method of claim 2, wherein after the determining the adjustment parameters based on the random code, the method further includes:
   judging whether the adjustment parameters satisfy at least one condition from: the adjustment length does not exceed a window length of a sliding window; and a corresponding sliding window exists at an adjustment position determined by the adjustment length; and
   if any one or more of the conditions is satisfied, adjusting the sliding window sequence based on the adjustment parameters.

5. The method of claim 2, wherein after the adjusting the window length of the one or more sliding windows in the sliding window sequence based on the adjustment parameters, the method further includes:
   acquiring a difference between a number of windows in the sliding window sequence and a number of sliding windows in the scrambled sliding window sequence;
   if the difference exceeds a first predetermined threshold, modifying the adjustment tendency; and
   redetermining an adjustment length of the random code based on the modified adjustment tendency so as to obtain corrected adjustment parameters.

6. The method of claim 1, wherein the traversing the scrambled sliding window sequence, and Montgomery modular multiplying the scrambled sliding window sequence includes:
   judging whether a sliding window length in the scrambled sliding window sequence exceeds a predetermined value;
   if the sliding window length exceeds the predetermined value, performing modular squaring processing on bits having a bit value of 0 in a sliding window to obtain a value after squaring and modulo;
   if the value after squaring and modulo exceeds a second predetermined threshold, adjusting the sliding window length; and
   returning to perform the scrambling processing on the sliding window sequence with which the sliding window length is adjusted.

7. The method of claim 6, further comprising:
   if the sliding window length does not exceed the predetermined value, extracting sliding window factors in the scrambled sliding window sequence; and
   modular squaring and modular multiplying the sliding window factors to obtain a second value after multiplication and modulo.

8. The method of claim 1, further comprising, prior to the acquiring the sliding window sequence of the key, generating a random code by a random code generator, wherein the scrambling is based on the random code.

9. The method of claim 1, wherein the acquiring the sliding window sequence of the key includes:
   acquiring a binary sequence of the key; and
   performing the sliding window traversal on the binary sequence and calculating to obtain a length of each sliding window, wherein multiple sliding windows form the sliding window sequence.

10. The method of claim 9, wherein the performing the sliding window traversal on the binary sequence and the calculating to obtain the length of each sliding window includes:
    performing window sliding from a first preset position to a second preset position of the binary sequence using a sliding window having a preset window length;
    ending window sliding when the sliding window runs into a situation where a bit has a value of 1, and continuing performing window sliding on the binary sequence from an end position until the entire binary sequence is traversed; and
    performing statistics on the length of each sliding window and making a calculation to obtain the sliding window sequence.

11. A key processing device, comprising:
    a memory;
    a processor coupled to the memory, the processor to execute instructions stored in the memory to:
       acquire a sliding window sequence of the key by performing a sliding window traversal on the key, the sliding window sequence including multiple sliding windows;

scramble one or more sliding windows in the sliding window sequence acquired from performance of the sliding window traversal on the key to obtain a scrambled sliding window sequence that represents a randomly changed distribution of the one or more sliding windows relative to the sliding window sequence; and traverse the scrambled sliding window sequence to perform post-processing on the scrambled sliding window sequence using a Montgomery modular multiplier.

12. The device of claim 11, wherein performance of the scramble the one or more sliding windows by the processor includes the processor operable to execute instructions stored in the memory to:

acquire a random code;

determine adjustment parameters based on the random code, the adjustment parameters including an adjustment tendency and an adjustment length; and adjust a window length of the one or more sliding windows in the sliding window sequence based on the adjustment parameters so as to obtain the scrambled sliding window sequence.

13. The device of claim 12, wherein performance of the determine the adjustment parameters based on the random code by the processor includes the processor operable to execute instructions stored in the memory to:

judge whether a value of the random code satisfies a preset condition;

if the value of the random code satisfies the preset condition, determine whether the adjustment tendency is increasing a sliding window length or decreasing the sliding window length; and determine an adjustment length based on the random code according to a range that the value of the random code is in.

14. The device of claim 12, wherein after performance of the determine the adjustment parameters based on the random code by the processor, further comprising the processor operable to execute instructions stored in the memory to:

judge whether the adjustment parameters satisfy at least one condition from: the adjustment length does not exceed a window length of a sliding window; and a corresponding sliding window exists at an adjustment position determined by the adjustment length; and if any one or more of the conditions is satisfied, adjust the sliding window sequence based on the adjustment parameters.

15. The device claim 12, wherein after performance of the adjust the window length of the one or more sliding windows in the sliding window sequence based on the adjustment parameters by the processor, further comprising the processor operable to execute instructions stored in the memory to:

acquire a difference between a number of windows in the sliding window sequence and a number of sliding windows in the scrambled sliding window sequence;

if the difference exceeds a first predetermined threshold, modify the adjustment tendency; and redetermine an adjustment length of the random code based on the modified adjustment tendency so as to obtain corrected adjustment parameters.

16. A non-transitory computer-readable medium having computer executable instructions for performing a method for processing a key, the method comprising:

acquiring a sliding window sequence of the key by performing a sliding window traversal on the key, the sliding window sequence including a plurality of sliding windows;

scrambling one or more sliding windows in the sliding window sequence acquired from performance of the sliding window traversal on the key to obtain a scrambled sliding window sequence that represents a randomly changed distribution of the one or more sliding windows relative to the sliding window sequence; and traversing the scrambled sliding window sequence, and Montgomery modular multiplying the scrambled sliding window sequence.

17. The non-transitory computer-readable medium of claim 16, Wherein the scrambling the one or more sliding windows includes:

acquiring a random code;

determining adjustment parameters based on the random code, the adjustment parameters including an adjustment tendency and an adjustment length; and adjusting a window length of the one or more sliding windows in the sliding window sequence based on the adjustment parameters so as to obtain the scrambled sliding window sequence.

18. The non-transitory computer-readable medium of claim 17, wherein the determining the adjustment parameters based on the random code includes:

judging whether a value of the random code satisfies a preset condition;

if the value of the random code satisfies the preset condition, determining whether the adjustment tendency is increasing a sliding window length or decreasing the sliding window length; and determining an adjustment length based on the random code according to a range that the value of the random code is in.

19. The non-transitory computer-readable medium of claim 17, wherein after the determining the adjustment parameters based on the random code, the method further includes:

judging whether the adjustment parameters satisfy at least one condition from: the adjustment length does not exceed a window length of a sliding window; and a corresponding sliding window exists at an adjustment position determined by the adjustment length; and if any one or more of the conditions is satisfied, adjusting the sliding window sequence based on the adjustment parameters.

20. The non-transitory computer-readable medium of claim 17, wherein after the adjusting the window length of the one or more sliding windows in the sliding window sequence based on the adjustment parameters, the method further includes:

acquiring a difference between a number of windows in the sliding window sequence and a number of sliding windows in the scrambled sliding window sequence;

if the difference exceeds a first predetermined threshold, modifying the adjustment tendency; and redetermining an adjustment length of the random code based on the modified adjustment tendency so as to obtain corrected adjustment parameters.

* * * * *